US010567943B2

(12) United States Patent
Edge

(10) Patent No.: US 10,567,943 B2
(45) Date of Patent: Feb. 18, 2020

(54) METHODS AND SYSTEMS FOR HANDOVER OF AN EMERGENCY CALL BETWEEN DIFFERENT WIRELESS NETWORKS

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/621,789

(22) Filed: Jun. 13, 2017

(65) Prior Publication Data

US 2017/0366955 A1 Dec. 21, 2017

Related U.S. Application Data

(60) Provisional application No. 62/350,327, filed on Jun. 15, 2016.

(51) Int. Cl.

| *H04W 4/90* | (2018.01) |
| *H04W 36/00* | (2009.01) |
| *H04W 36/22* | (2009.01) |
| *H04M 11/04* | (2006.01) |
| *H04W 76/50* | (2018.01) |
| *H04W 40/24* | (2009.01) |
| *H04W 84/12* | (2009.01) |
| *H04W 36/14* | (2009.01) |

(52) U.S. Cl.
CPC ............. *H04W 4/90* (2018.02); *H04M 11/04* (2013.01); *H04W 36/0022* (2013.01); *H04W 36/22* (2013.01); *H04W 40/24* (2013.01); *H04W 76/50* (2018.02); *H04W 36/14* (2013.01); *H04W 84/12* (2013.01)

(58) Field of Classification Search
CPC ....... H04W 4/90; H04W 40/24; H04W 76/50; H04W 36/22; H04W 84/12; H04W 36/0022; H04W 36/14; H04M 11/04
See application file for complete search history.

(56) References Cited

U.S. PATENT DOCUMENTS

| 9,532,276 | B1 * | 12/2016 | Malhotra | .......... | H04W 36/0022 |
| 2001/0036167 | A1 * | 11/2001 | Menon | ................ | G06Q 10/087 |
| | | | | | 370/337 |
| 2013/0072146 | A1 * | 3/2013 | Smith | ................... | H04W 72/10 |
| | | | | | 455/404.1 |

(Continued)

*Primary Examiner* — Said M Elnoubi
(74) *Attorney, Agent, or Firm* — Narria M. Zohn

(57) ABSTRACT

A method is provided to enable handoff of an emergency services call between different network operators. A UE may establish a first call with a first network for a first network operator based on a first wireless access type, where the first call is an emergency services call to a PSAP. The UE may then determine impaired wireless coverage for the first wireless access type and unimpaired wireless coverage for a second wireless access type for a second network, where the second network is for a second network operator different to the first network operator. The UE may then establish a second call with the second network based on the second wireless access type, where the second call is a continuation of the first call to the PSAP. In embodiments, the first wireless access type is WiFi and the second wireless access type is cellular.

10 Claims, 14 Drawing Sheets

(56) References Cited

U.S. PATENT DOCUMENTS

| | | | | |
|---|---|---|---|---|
| 2015/0024703 A1* | 1/2015 | Lindholm | ............... | H04W 4/90 |
| | | | | 455/404.1 |
| 2015/0280963 A1* | 10/2015 | Bollapalli | ........... | H04L 41/0206 |
| | | | | 709/227 |
| 2016/0295385 A1* | 10/2016 | Wang | ...................... | H04W 4/90 |

* cited by examiner

METHODS AND SYSTEMS FOR HANDOVER OF AN EMERGENCY CALL BETWEEN DIFFERENT WIRELESS NETWORKS

CROSS-REFERENCE TO RELATED APPLICATION(S)

This application claims the benefit of U.S. Provisional Application Ser. No. 62/350,327, entitled "METHODS AND SYSTEMS FOR EMERGENCY CALL HANDOVER FROM WIFI ACCESS TO CELLULAR ACCESS" and filed on Jun. 15, 2016, which is expressly incorporated by reference herein in its entirety.

BACKGROUND

Field

Embodiments described herein are directed to techniques for maintaining emergency wireless calls when a user moves between coverage areas of different wireless networks.

Information

Wireless communication systems have developed through various generations, including a first-generation analog wireless phone service (1G), a second-generation (2G) digital wireless phone service (including interim 2.5G networks) and third-generation (3G) and fourth-generation (4G) high speed data/Internet-capable wireless services.

More recently, Long Term Evolution (LTE) has been developed by the 3rd Generation Partnership Project (3GPP) as a 4G radio access network technology for wireless communication of high-speed data and packetized voice for mobile phones and other mobile terminals. LTE has evolved from the Global System for Mobile Communications (GSM) system and from derivatives of GSM, such as Enhanced Data rates for GSM Evolution (EDGE), Universal Mobile Telecommunications System (UMTS), and High-Speed Packet Access (HSPA). Most recently, 3GPP has started to develop a Fifth Generation (5G) wireless system, also referred as New Radio (NR), and has defined standards to enable access to a 4G LTE core network, also referred to as an Evolved Packet Core (EPC), from Institute of Electrical and Electronics Engineers (IEEE) 802.11 WiFi Access Points (APs), thereby enabling wireless coverage for 4G LTE network operators using WiFi (also referred to as Wi-Fi).

Specifications defined by 3GPP for support of emergency calls enable a user equipment (UE) to originate an emergency call using a 3GPP defined 2G, 3G or 4G wireless access type or a WiFi AP with connectivity to a 3GPP 4G core network, where the emergency call is routed by a 3GPP core network (e.g. an EPC) to a Public Safety Answering Point (PSAP) whose service coverage area includes the location of the calling UE. 3GPP specifications also support certain types of handover of an emergency call that may need to occur when an emergency call moves to a new location and no longer has wireless coverage from a previous serving base station or WiFi AP. However, handover of an emergency call is usually restricted to one network operator and may have limitations. Thus, there is a need for techniques for maintaining emergency wireless calls when a user moves between coverage areas of different wireless networks.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Specifications defined by 3GPP for support of emergency calls enable a UE to originate an emergency call using a 3GPP defined 2G, 3G or 4G wireless access type or a WiFi AP with connectivity to a 3GPP 4G core network, where the emergency call is routed by a 3GPP core network (e.g. an EPC) to a PSAP whose service coverage area includes the location of the calling UE. 3GPP specifications also support certain types of handover of an emergency call that may need to occur when an emergency call moves to a new location and no longer has wireless coverage from a previous serving base station or WiFi AP. However, handover of an emergency call is usually restricted to one network operator and may have limitations. Thus, there is a need for techniques for maintaining emergency wireless calls when a user moves between coverage areas of different wireless networks.

The present disclosure provides a solution by enabling the handover of an emergency call from a first network operator (e.g., an operator accessed using WiFi) to a second network operator (e.g., an operator accessed via a cellular network) when a UE moves from a first location to a second location. For example, the second location may have wireless coverage for the second network operator but not for the first network operator.

In an aspect of the disclosure, a method, a computer-readable medium, and an apparatus are provided. In certain implementations, the apparatus may establish a first call with a first network for a first network operator based on a first wireless access type, where the first call is an emergency services call to a public safety answering point (PSAP). The apparatus may determine impaired wireless coverage for the first wireless access type. The apparatus may determine unimpaired wireless coverage for a second wireless access type for a second network, where the second network is for a second network operator different to the first network operator. The apparatus may establish a second call with the second network based on the second wireless access type, where the second call is a continuation of the first call to the PSAP.

In certain other implementations, the apparatus may receive a first request to establish an emergency services call to a PSAP on a behalf of a UE. The apparatus may forward the first request towards the PSAP. The apparatus may receive a first response from the PSAP. In one aspect, the first response may indicate acceptance of the first request. The apparatus may determine an Emergency Session Transfer Identifier (E-STI). In one aspect, the E-STI may indicate the network entity and handoff of an emergency services call. The apparatus may forward the first response towards the UE, the first response comprising the E-STI.

In certain other implementations, the apparatus may receive a first request to establish an emergency services call on behalf of a UE. In one aspect, the first request may comprise a E-STI. The apparatus may refrain from forwarding the first request towards a PSAP, based on the E-STI. The apparatus may forward the first request towards a second network for a second network operator different to the first network operator, based on the E-STI.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF SUMMARY OF THE DRAWINGS

Non-limiting and non-exhaustive aspects are described with reference to the following figures.

Figure 1:
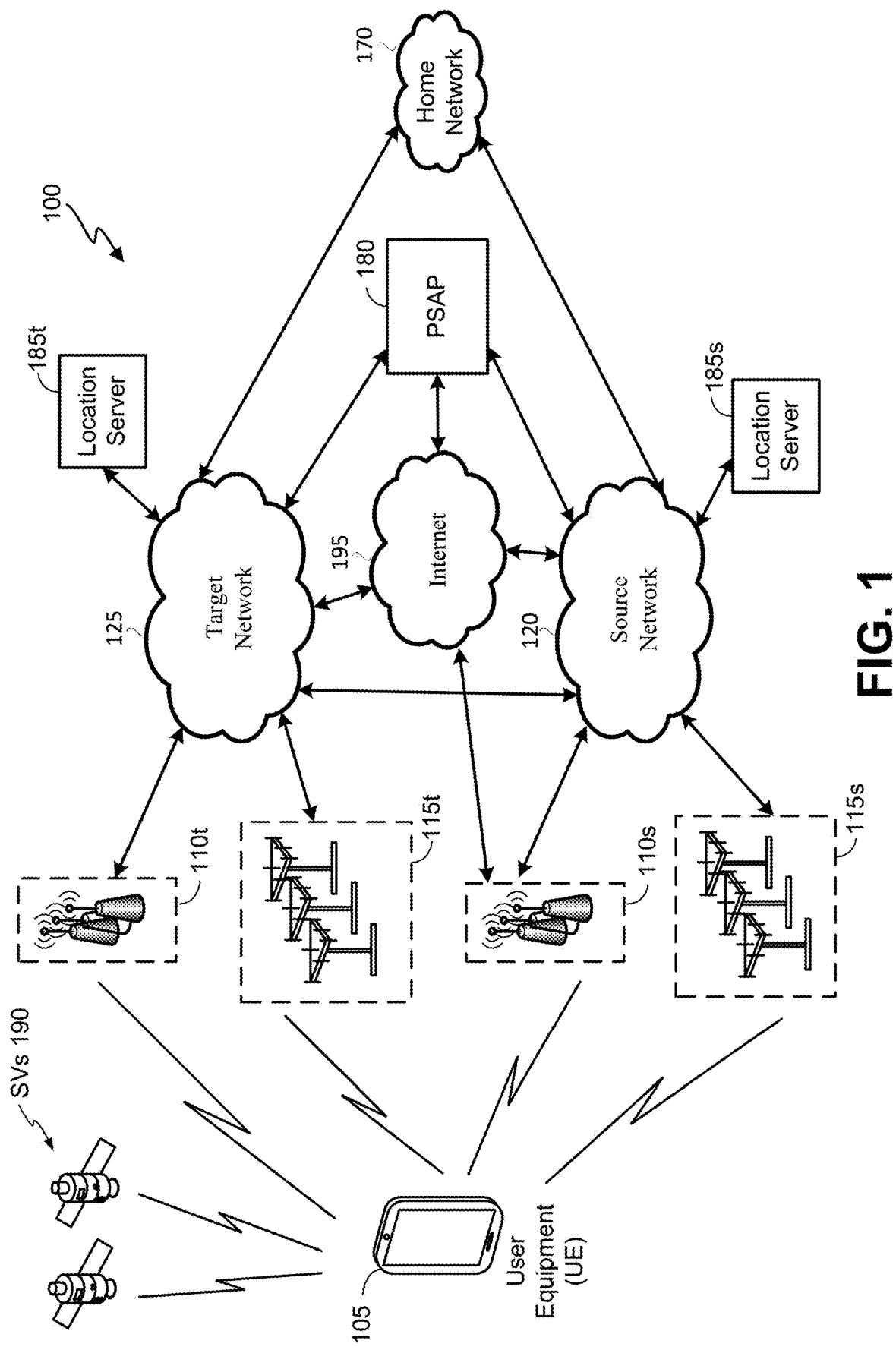
FIG. 1 is a simplified illustration of an embodiment of a communication system capable of handover of an emergency call according to techniques described herein.

Elements, stages, steps and actions with the same reference label in different drawings may correspond to one another (e.g. may be similar or identical to one another). Further, some elements in the various drawings are labelled using a numeric prefix followed by an alphabetic or numeric suffix. Elements with the same numeric prefix but different suffices may be different instances of the same type of element. The numeric prefix without any suffix is then used herein to reference any element with this numeric prefix. For example, different instances 110s and 110t of an AP are shown in FIG. 1. A reference to an AP 110 may then refer to AP 110s, AP 110t or both APs.

DETAILED DESCRIPTION

In the description below, the terms "emergency call" and "emergency services call" are used synonymously. The terms "IMS emergency call" and "IMS emergency services call" are also used synonymously to refer to an emergency call made with the assistance or participation of an IP Multimedia System (IMS) in a wireless network. Further, the terms "handover" and "handoff" are used synonymously and refer to transfer of an ongoing communications call or session made over a wireless access from one wireless base station (BS) or access point (AP) to another BS or AP such that communication is not interrupted or not noticeably interrupted. For example, in the case of an emergency call where a voice path has been established between a UE and a PSAP, the handoff may cause some small loss of voice communication (e.g. loss occurring over a period of 100 ms) but may not disturb the voice communication to the extent of requiring the user of the UE or the PSAP operator to have repeat or ask for a repetition of part of a conversation.

The term emergency call is used below to refer to a manual or automatically instigated call from a UE to a PSAP, due to some emergency related condition at or associated with the user of the UE, in which one or more different media paths are established between the UE and the PSAP. The media paths will typically include a voice media path but may also include media paths for transfer of video, text and/or data. When handover of an emergency call occurs, it is usually required that at a minimum any voice media path be successfully transferred from one base station or AP to another and that, if possible, any other media paths be similarly transferred. Handover typically occurs between base station or APs supporting the same wireless access type and owned by the same network operator. However, handover between base stations or APs that support different wireless access types but that are supported by or associated with the same network operator may also be supported.

FIG. 1 is a simplified illustration of an embodiment of a communication system 100 capable of supporting handover of an emergency call according to the techniques described herein. More specifically, the techniques described herein may be implemented by one or more components of the communication system 100. The communication system 100 can include a UE 105, one or more space vehicles (SVs) 190, one or more base stations (BSs) 115, one or more access points (APs) 110, a source network 120, a target network 125, a home network 170, the Internet 195, a location server 185 and a PSAP 180.

It should be noted that FIG. 1 provides only a generalized illustration of various components, any or all of which may be utilized as appropriate, and each of which may be duplicated (or absent) as necessary. Specifically, although only one UE 105 is illustrated, it will be understood that many UEs (e.g., hundreds, thousands, millions, etc.) may utilize the communication system 100. Similarly, the communication system 100 may include a larger or smaller number of base stations 115 and/or APs 110 than illustrated in FIG. 1. The illustrated connections that connect the various components in the communication system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. A person of ordinary skill in the art will recognize many modifications to the components illustrated.

The UE 105 may comprise and/or be referred to herein as a device, a mobile device, a wireless device, a mobile terminal, a terminal, a mobile station (MS), a Secure User Plane Location (SUPL) Enabled Terminal (SET), or by some other name. Moreover, UE 105 may correspond to a cellphone, smartphone, laptop, tablet, PDA, tracking device or some other portable or moveable device. Typically, though not necessarily, the UE 105 may support wireless communication using one or more Radio Access Technologies (RATs) such as using GSM, Code Division Multiple Access (CDMA), Wideband CDMA (WCDMA), LTE, High Rate Packet Data (HRPD), WiFi (also referred to as Wi-Fi), Bluetooth® (BT), Worldwide Interoperability for Microwave Access (WiMAX), 5G, NR, etc. The UE 105 may also support wireless communication using a Wireless Local Area Network (WLAN) which may connect to other networks (e.g. the Internet 195) using a Digital Subscriber Line (DSL) or packet cable for example. As indicated above, one or more of these RATs may enable the UE 105 to communicate with the PSAP 180.

The UE 105 may comprise a single entity or may comprise multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geographic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geographically or in civic form) within which the UE 105 is expected to be located with some probability or confidence level (e.g., 67% or 95%). A location of the UE 105 may further be a relative location comprising, for example, a distance and direction or relative X, Y (and Z) coordinates defined relative to some origin at a known location which may be defined geographically, in civic terms, or by reference to a point, area, or volume indicated on a map, floor plan or building plan. In the description contained herein, the use of the term location may comprise any of these variants unless indicated otherwise.

Source network 120 may provide wireless access to UE 105 (e.g. using any of the RATs described previously) at some initial set of times. Target network 125 may provide wireless access to UE 105 (e.g. using any of the RATs described previously) at some later set of times—e.g. after UE 105 has moved from a location with wireless coverage from source network 120 to a new location with wireless coverage from target network 125 but not from source network 120. Source network 120 and target network 125 may be owned, operated and/or managed by different network operators. Home network 170 may be a network with which the user of UE 105 maintains a subscription for wireless services. Home network 170 may be the same as source network 120 or the same as target network 125 in some scenarios. The terms "source network" and "target network" as used herein refer to the relationship of networks 120 and 125 to UE 105 and specifically to handover of an emergency call for UE 105 from source network 120 to target network 125 as described herein below. The terms may not imply any other properties of networks 120 and 125 which may each also be referred to a "serving network" for UE 105 when providing wireless coverage for UE 105 and/or as a home network for UE 105 when the same as home network 170.

Depending on desired functionality, the source network 120, target network 125 and home network 170 may each comprise any of a variety of wireless and/or wireline networks. These networks 120, 125 and 170 can, for example, comprise any combination of public and/or private networks, local and/or wide-area networks, and the like. Furthermore, networks 120, 125 and 170 may utilize one or more wired and/or wireless communication technologies. In some embodiments, the networks 120, 125 and 170 may comprise a cellular network, some other wireless wide area network (WWAN) and/or a wireless local area network (WLAN), for example. Particular examples of networks 120, 125 and 170 include a Universal Mobile Telecommunications Service (UMTS) wireless network, a WCDMA wireless network, an LTE wireless network (also referred to as an Enhanced Packet System (EPS)), a Fifth Generation (5G) wireless network (also referred to as New Radio (NR) wireless network), a WiFi WLAN and the Internet. LTE, GSM, WCDMA, UMTS, 5G and NR are wireless technologies defined, or being defined, by the $3^{rd}$ Generation Partnership Project (3GPP). Networks 120, 125 and 170 may also include more than one network and/or more than one type of network.

Under non-emergency situations, the UE 105 may communicate with the home network 170 for authentication and authorization purposes. This communication from the UE 105 to the home network 170 may be made via the current serving network (e.g. source network 120 or target network 125) and Internet 195. (It will be understood, however, that the configuration of the source network 120, target network 125, home network 170, and/or Internet 195 can vary, depending on desired functionality.) Each of the source network 120, target network 125 and home network 170 may also provide IP multimedia subsystem (IMS) services and/or other services. As discussed in further detail below, the home network 170 may be bypassed or partially bypassed during emergency calls, for both voice channel establishment and for handover, in accordance with the techniques disclosed herein.

The base stations 115 and access points (APs) 110 are communicatively coupled to the source network 120 and target network 125. For ease and clarity of reference, any specific instance of an entity with numeric label N that is part of or associated with source network 120 is labelled "Ns", and any specific instance of the entity that is part of or associated with target network 125 is labelled as "Nt". Thus, FIG. 1 shows a set of base stations 115*s* and a set of APs, 110*s* that belong to or are associated with source network 120 and a further set of base stations 115*t* and set of APs 110*t* that belong to or are associated with target network 125. In some cases, where an AP or base station is or can be shared by both source network 120 and target network 125, the base station or AP may be labelled with either the "s" or "t" suffix.

Depending on the technology of the networks 120 and 125, a base station 115 may comprise a Node B, an Evolved Node B (also referred to as an eNodeB or eNB), a base transceiver station (BTS), a radio base station (RBS), or the like. A base station 115 may support a WWAN technology or RAT such as GSM, WCDMA, LTE or 5G. An AP 110 may comprise a WiFi AP or a Bluetooth AP. Thus, the UE 105 can send and receive information to and from other devices and networks, such as PSAP 180, location server 185*s* or 185*t* or the Internet 195, by accessing the source network 120 via a base station 115*s* or AP 110*s* or (e.g. at a later time) by accessing the target network 125 via a base station 115*t* or AP 110*t*.

The location servers 185*s* and 185*t* may each comprise a server and/or other computing device configured to determine a location estimate for the UE 105 and/or provide data (e.g., "assistance data") to the UE 105 to facilitate the location determination. According to some embodiments, a location server 185 may comprise a Secure User Plane Location (SUPL) Location Platform (SLP) server, which may support the SUPL user plane (UP) location solution defined by the Open Mobile Alliance (OMA) and may support location services for UE 105 based on subscription information for UE 105 stored in the location server 185. In some embodiments, the location server 185 may comprise a Discovered SLP (D-SLP) or an Emergency SLP (E-SLP). The location server 185 may also comprise an Enhanced Serving Mobile Location Center (E-SMLC) that supports location of UE 105 using a control plane (CP) location solution for LTE access by UE 105. A location server 185 may further comprise a Location Management Function (LMF) that supports location of UE 105 using a control plane (CP) location solution for 5G or NR wireless access by UE 105. In a CP location solution, signaling to control and manage the location of UE 105 may be exchanged between elements of a serving network (e.g. source network 120 or target network 125), and with UE 105, using existing network interfaces and protocols and as signaling from the perspective of the serving network. In a UP location solution, signaling to control and manage the location of UE 105 may be exchanged between a location server 185 and UE 105 as data (e.g. data transported using the Internet Protocol (IP) or Transmission Control Protocol (TCP) and IP (TCP/IP)) from the perspective of a serving network.

In particular implementations, UE 105 may have circuitry and processing resources capable of obtaining location related measurements (e.g. for signals received from SVs 190, APs 110, and/or base stations 115) and possibly computing a position fix or estimated location of the UE 105 based on these location related measurements. In some implementations, location related measurements obtained by the UE 105 may be transferred to a location server 185 after which the location server 185 may estimate or determine a location for the UE 105 based on the measurements. Location related measurements obtained by the UE 105 may include measurements of signals received from SVs 190 belonging to a Satellite Positioning System (SPS) or Global Navigation Satellite System (GNSS) such as the Global Positioning System (GPS), GLONASS, Galileo or Beidou, and/or may include measurements of signals received from terrestrial transmitters fixed at known locations (e.g., such as base stations 115 and/or APs 110). The UE 105 and/or location server 185 may then obtain a location estimate for the UE 105 based on these location related measurements using any one of several known position methods such as, for example, GNSS, Assisted GNSS (A-GNSS), Advanced Forward Link Trilateration (AFLT), Observed Time Difference Of Arrival (OTDOA), or Enhanced Cell ID (E-CID), or combinations thereof.

An emergency call from the UE 105 may be routed to or towards the PSAP 180 based on the location of the UE. For example, the PSAP 180 may be a PSAP whose public safety service area includes the location that was determined for the UE 105 by either the UE 105 or a location server 185.

The PSAP 180, as represented in FIG. 1, may comprise one or more devices to which emergency calls may be routed. Furthermore, although FIG. 1 illustrates the PSAP 180 as having separate connections with the source network 120, target network 125 and the Internet 195, other configurations are possible. For example, in some embodiments, the PSAP 180 may be directly connected with only one or two of networks 120, 125 and the Internet 195.

In some scenarios, the UE 105 may need to instigate an emergency call—e.g. if the user of UE 105 dials an emergency related number such as "911" in North America or "112" in Europe. In some scenarios, an emergency call may be instigated by the UE 105 by automatic means such as when sensors attached or connected to UE 105 detect some emergency situation such as a medical condition for the user of UE 105 or an accident in a vehicle containing UE 105 and the user of UE 105. In such scenarios and, as described in more detail later, the UE may use some nearby base station 115 or AP 110 to instigate an emergency call using source network 120 to PSAP 180. After the establishment of the emergency call the user of UE 105 may move to a new location (e.g. in order to leave a location associated with a danger to the user such as a building on fire or a vehicle in the middle of a road). The UE 105 may then lose or start to lose wireless coverage from a currently serving base station 115 or AP 110 and need to find wireless coverage from a new base station 115 or new AP 110 which may belong to or be associated with target network 125 rather than with source network 120. This may necessitate handover of the emergency call between networks 120 and 125.

In one particular example of handover of an emergency call from source network 120 to target network 125, the UE may start with coverage by a WiFi AP 110s associated with source network 120 and perform handover to an LTE base station (or eNodeB) 115t for target network 125. An emergency call instigated initially over WiFi may only occur if no cellular access is available at the current location of UE 105 because WiFi access may typically have lowest priority for use for an emergency call due to its lower reliability. Accordingly, UE 105 may not always be aware which wireless networks provide cellular coverage around the UE 105's current location (e.g. if no base stations 115 are visible at the UE 105's location). In establishing an emergency call over a visible WiFi AP 110s, UE 105 may thus need to select the source network 120 without awareness of whether source network 120 has base stations 115 (and thus wireless coverage) at or nearby to UE 105's current location. For example, source network 120 may be the home network 170 if the UE is aware if being in the home country or may be a network for another country UE 105 is located in if UE 105 is aware of being in the other country. The emergency call may then be routed from the AP 110s to source network 120, and may be further routed by source network 120 to PSAP 180. Although source network 120 may be able to support an emergency services call via a WiFi AP 110s at UE 105's current location, the operator for source network 120 may not provide cellular coverage at and around the current location. Hence, if UE 105 moves a short distance out of WiFi coverage of AP 110s, UE 105 may not encounter cellular coverage from source network 120 but may instead encounter cellular coverage from target network 125 whose operator is different to the operator for source network 120. At that point, in a traditional communications system, the emergency call may drop (i.e. be released) because handover from WiFi access via source network 120 to cellular access from target network 125 associated with a different operator to source network 120 may not be supported by UE 105 or by source network 120 and/or target network 125. For example, the support may not be defined by existing wireless standards such as 3GPP standards.

One solution to this problem, described further herein, is to make use of a variant of Dual Radio Voice Call Continuity (DRVCC), which is normally intended to support handover of non-emergency calls between different wireless access types (e.g. Circuit Switched (CS) and Packet Switched (PS)) belonging to the same network operator. With the variant of DRVCC, an emergency services call established by UE 105 using WiFi AP 110s to access source network 120 is anchored at some network element, referred to herein as an "anchor point", in source network 120. In some embodiments, as described later, the anchor point may be an Emergency Access Transfer Function (EATF) in an IP Multimedia Subsystem (IMS) for source network 120, and may also be used to support Single Radio Voice Call Continuity (SRVCC) for an IMS emergency call as defined by 3GPP Technical Specifications (TSs) 23.167, 23.237 and 23.206. The anchor point (e.g. EATF) or some other network element in source network 120 may return an identifier, referred to herein as an Emergency Session Transfer Identifier (E-STI), to UE 105 while establishing the emergency call from the UE via WiFi AP 110s. When UE 105 moves later out of radio coverage of the WiFi AP 110s and into cellular radio coverage provided by a base station 115t for target network 125, the E-STI may be used by UE 105 to establish a new call leg from UE 105 to the anchor point in source network 120 via the base station 115t and the target network 125. The anchor point may then remove the old call leg from UE 105 to the anchor point via the WiFi AP 110s and substitute for this the new call leg from base station 115t and target network 125.

The E-STI may comprise a telephone number, also referred to as a Directory Number (DB), an International Telecommunications Union (ITU) E.164 telephone number, a Uniform Resource Identifier (URI), a Uniform Resource Name (URN), a Session Initiation Protocol (SIP) URI, a Telephone Number (Tel) URI, or some other sequence of digits or characters serving as an identifier. The E-STI may identify (e.g. provide a routable address for) an anchor point in the source network 120 (e.g. may identify anchor point 130 described later for FIG. 2). The E-STI may also identify the emergency call and/or the UE 105. The E-STI may further indicate an emergency call or handover of an emergency call to other networks such as target network 125.

Table 1 shows some examples of an E-STI. Row A of Table 1 shows an example of an E-STI that comprises an E.164 telephone number (or DN) which, in this example, is an international number starting with country code "1" (for the US) followed by a 10 digit North American Numbering Plan (NANP) number 4804161234. For example, this number may belong to (e.g. have been assigned to) source network 120 and may identify an anchor point (e.g. the anchor point 130 described later). Row B shows an example of an E-STI that is a Telephone Number (Tel) URI and, in this example, contains the same international telephone number as the example in row A. Rows C, D and E show examples of E-STIs that are encoded as URNs and each contain an explicit indication of handover of an emergency call via inclusion of the words "sos" and "handover" as part of the URN. For the example in row C, a network address is appended to the URN identifying the source network 120 through a Mobile Country Code (MCC) and Mobile Network Code (MNC). For the example in row D, a local UE identification ("98765" in this example) is also included which may be assigned by the anchor point (e.g. anchor point 130) to indicate the UE 105 locally to the anchor point. In the example in row E, an indication of a particular anchor point which is an EATF (EATF "12" in this example) is further included which may identify the anchor point (e.g. anchor point 130) in source network 120 when the anchor point is an EATF. The example URNs in rows C, D and E may enable routing of the emergency call from the target network 125 into the source network 120 and to the anchor point (e.g. anchor point 130), where the particular UE 105 may also be identified from the E-STI in the examples for rows D and E.

In the example in row F of Table 1, the E-STI is a SIP URI which may identify both the UE 105 locally to the anchor point (from the digits "98765") and the anchor point in the source network 120 (from the EATF, MNC and MCC identifiers) when the anchor point (e.g. anchor point 130) is an EATF. In the example of an E-STI that is a SIP URI in row G, an explicit indication of handover of an emergency call is also included. The examples of an E-STI in rows C, D, E and G all indicate handover of an emergency call and may enable the target network 125 to provide priority treatment to the handover but avoid routing the call to a PSAP 180 and instead route the call to the anchor point (e.g. anchor point 130) in the target network 125. The examples of an E-STI in rows A, B and F do not indicate handover of an emergency call and may instead be treated as a normal call by target network 125 causing routing of the call to the anchor point (e.g. anchor point 130) in the source network 120 but without priority treatment.

TABLE 1

| Row | E-STI Type | E-STI Example |
|-----|------------|---------------|
| A | E.164 Telephone Number | 14804161234 |
| B | Tel URI | tel: +1-480-416-1234 |
| C | URN | urn: service: sos.handover@mnc012.mcc345.3gppnetwork.org |
| D | URN | urn: service: sos.handover@ue98765.mnc012.mcc345.3gppnetwork.org |
| E | URN | urn: service: sos.handover@ue98765.eatf12.mnc012.mcc345.3gppnetwork.org |
| F | SIP URI | sip: 98765@eatf12.mnc012.mcc345.3gppnetwork.org |
| G | SIP URI | sip: soshandover98765@eatf12.mnc012.mcc345.3gppnetwork.org |

The E-STI may be transferred to UE 105 by the anchor point in source network 120 during initial establishment of the emergency call by source network 120 (e.g. in a SIP 200 OK message). The E-STI may be seen as an emergency number (or emergency URI) by target network 125 allowing UE 105 to instigate handover from source network 120 to target network 125 by instigating a new emergency call to target network 125 via a base station, which may allow priority treatment in target network 125 and may support handover when UE 105 is not subscribed to normal service by target network 125 or does not contain valid authentication credentials (e.g. such as by not having a Universal Integrated Circuit Card (UICC) card). The DRVCC procedure may be used to handover the emergency call from any wireless access type for source network 120 to any wireless access type for target network 125 (e.g. GSM, UMTS, LTE, WiFi, 5G, NR), although the examples focus mainly on handover from WiFi access for source network 120 to LTE access for target network 125.

In a particular example of the techniques described herein, the user of UE 105 may be inside a building with no cellular coverage but with at least one visible WiFi access point 110s. The user may discover a fire inside the building and place an emergency call to 9-1-1 using the visible Wi-Fi AP 110s. The emergency call may be answered by a call taker at a local PSAP 180 allowing the user to start to describe the fire situation to the call taker. However, soon after placing the emergency call, the user may need to escape from the building and may then lose WiFi coverage from AP 110s but may regain cellular network coverage from a base station 115t for target network 125. During the transition from inside of the building to outside, the emergency call may be successfully transferred from WiFi access using AP 110s to a cellular network access via base station 115t without loss of connectivity (e.g. voice connectivity) between the user and the emergency call taker by using embodiments of the techniques described herein.

Figure 2:
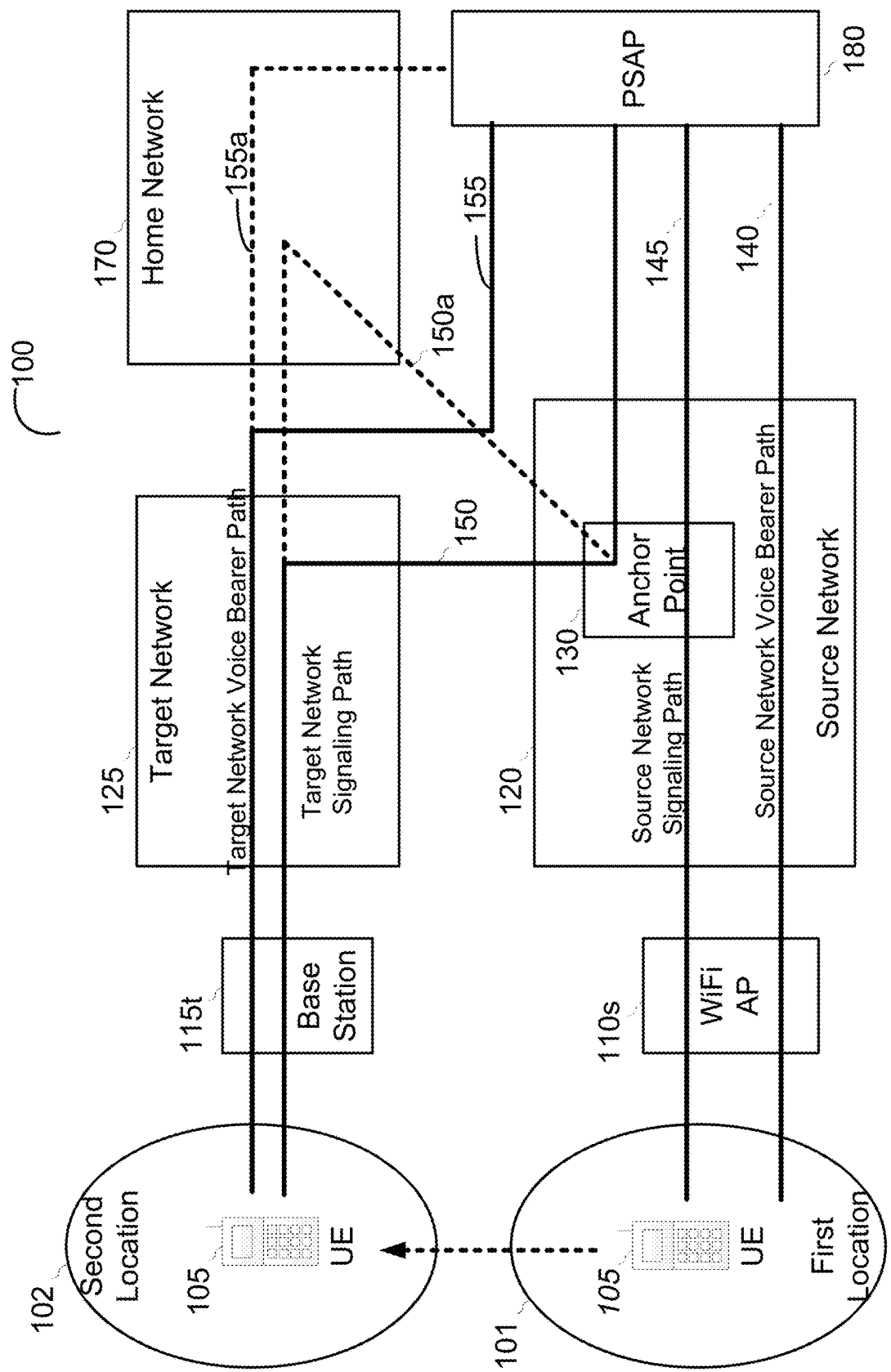
FIG. 2 is an architecture based diagram illustrating handover of an emergency call from WiFi access to cellular access for the communication system of FIG. 1.

FIG. 2 shows more details for instigation and handover of an emergency services call for the communication system 100. FIG. 2 shows handoff from a WiFi AP 110s associated with source network 120 to an LTE base station (or eNodeB) 115t associated with target network 125. Initially the UE 105 is as a first location 101 and originates an emergency call using WiFi AP 110s to access source network 120 (e.g. after the user of UE 105 dials an emergency number like "911" or "112"). WiFi AP 110s may be trusted by source network 120 and may enable access using an S2a interface as defined by 3GPP in 3GPP TS 23.402. Alternatively, WiFi AP 110s may not be trusted by source network 120 and may enable access to source network 120 via an S2b interface as defined in 3GPP TS 23.402 which may use an evolved Packet Data Gateway (ePDG) (not shown in FIG. 2) which may be part of source network 120 and accessed from WiFi AP 110s using the Internet 195. The emergency call may be routed by source network 120 through the anchor point 130 and to the PSAP 180 and may be established via signaling interaction between UE 105, source network 120, anchor point 130 and PSAP 180 as described in more detail later in FIG. 3. The signaling path 145 used for these interactions, referred to herein as a "source network signaling path", may include sending signaling through WiFi AP 110s and receiving and sending signaling by UE 105, anchor point 130, PSAP 180 and possible other elements in source network 120 (not shown in FIG. 2) such as an Emergency Call Session Control Function (E-CSCF), a Media Gateway Control Function (MGCF), and/or a Proxy Call Session Control Function (P-CSCF). As an example, when Session Initiation Protocol (SIP) signaling is used on all segments of source network signaling path 145, the anchor point 130 may function as a SIP back to back user agent.

During establishment of the emergency call from UE 105 to PSAP 180 via WiFi AP 110s and source network 120, the voice bearer path 140 shown in FIG. 1, referred to here as a "source network voice bearer path", may be established between UE 105 and PSAP 180 which may convey speech traffic (e.g. Voice Over IP (VoIP) conveyed using the Real-time Transport Protocol (RTP)) between UE 105 and PSAP 180. The source network voice bearer path 140 may be conveyed through WiFi AP 110s and through some elements of source network 120 (e.g. an ePDG and/or Packet Data Network (PDN) Gateway, not shown in FIG. 2) though may not be conveyed through Anchor Point 130.

At some later time, UE 105 may move from first location 101 to a second location 102. At second location 102, wireless coverage from WiFi AP 110s may not be present or may be very weak but cellular coverage from Base Station (BS) 115t belonging to target network 125 may be available. Accordingly, the emergency call from UE 105 to PSAP 180 may need to handover from WiFi AP 110s to BS 115t. To support the handover, signaling may be exchanged between UE 105, target network 125 (e.g. a P-CSCF and/or an E-CSCF in target network 125, not shown in FIG. 2), the anchor point 130 in source network 120 and the PSAP 180 using target network signaling path 150 shown in FIG. 2. The target network signaling path 150 and the source network signaling path 145 may overlap and may use the same signaling path between the anchor point 130 and the PSAP 180 including all entities intermediate between them (e.g. such as E-CSCF and/or MGCF, not shown in FIG. 2).

Following the handover, the source network signaling path 145 may be replaced by the target network signaling path 150 for any further signaling that may be needed (e.g. such as for call release or addition or removal of various media such as text or video). Similarly, following handover, the source network voice bearer path 140 in FIG. 2 may be replaced by the target network voice bearer path 155 which may be used to maintain voice connectivity between the UE 105 and PSAP 180.

The target network signaling path 150 and target network voice bearer path 155 shown in FIG. 2 (shown by the bold solid lines) exemplify the case where the target network 125 performs handover without making use of home network 170 (or is the home network 170) and where PSAP 180 is an IP capable PSAP supporting VoIP transfer. If PSAP 180 is a legacy PSAP supporting CS access rather than PS access, the target network voice bearer path 155 and the source network voice bearer path 140 may overlap and may use the same voice bearer path between a Media Gateway (MGW) (not shown in FIG. 2) in the source network 120 and the PSAP 180 including all entities intermediate between them.

In an embodiment of the handover shown in FIG. 2, handover may be performed by the home network 170 rather than by target network 125. This embodiment may occur when target network 125 is not home network 170 and when BS 115t provides 5G, LTE or UMTS PS access to an IMS in the home network 170 for UE 105 via target network 125 and when the E-STI does not indicate an emergency call or handover of an emergency call. In this embodiment, the target network signaling path 150 and the target network voice bearer path 155 may include the extensions 150a and 155a, respectively, shown by the dashed lines in FIG. 2 that pass through the home network 170.

In a further embodiment of the handover shown in FIG. 2 where PSAP 180 supports CS emergency calls rather than IP based emergency calls, target network voice bearer path 155 (or 150 plus 155a when handover is supported by home network 170) may pass through target network 125 (and possibly home network 170) and then pass through source network 120 prior to reaching PSAP 180. In this embodiment, source network 120 (e.g. an MGW in source network 120) may perform conversion of VoIP to CS based voice in order to support CS access to PSAP 180. Thus, in this embodiment, target network voice bearer path 155 (or 155 plus 155a) does not bypass source network 120 as implied in FIG. 2.

Figure 3:
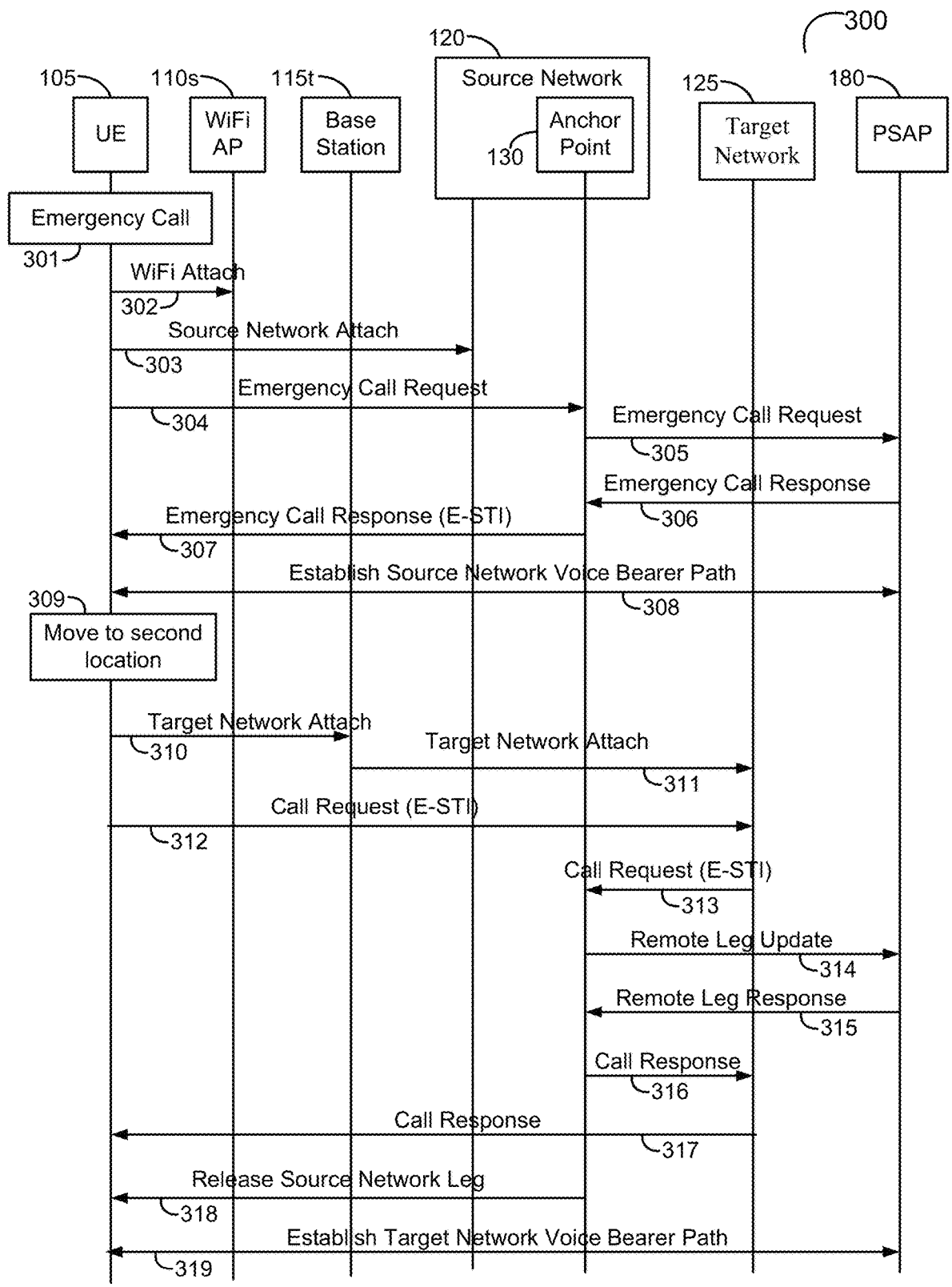
FIG. 3 is a signaling flow illustrating handover of an emergency call from WiFi access to cellular access for the communication system of FIG. 1.

FIG. 3 shows a signaling flow 300 which may be used to establish and handover an emergency call for the communication system 100 in association with the signaling and voice bearer paths and other features shown in FIG. 2. Initially the UE 105 is at first location 101. The user of UE 105 or some automatic capability in UE 105 (e.g. driven by sensors) then invokes an emergency call at stage 301—e.g. by dialing the digits "911" in the case of user initiation. If the UE 105 is not already associated with (e.g. registered with) WiFi AP 110s, UE 105 associates with (e.g. attaches to and/or registers with) WiFi AP 110s at stage 302. UE 105 then attaches to source network 120 via the WiFi AP 110s at stage 303—e.g. the UE 105 selects source network 120 based on configuration information in UE 105 and/or based on a Domain Name Server (DNS) query to find a source network able to support an emergency call via WiFi for the country in which UE 105 is located. In some cases, source network 120 may be the home network 170 for UE 105— e.g. if first location 101 is in the home country for UE 105.

The attachment at stage 303 in signaling flow 300 may employ an S2a interface or an S2b interface in source network 120. In the case of an untrusted WiFi AP 110s, UE 105 may select an ePDG in source network 120 and use this as the point of entry to source network 120 via an S2b interface as described in 3GPP TS 23.402. In the case of a trusted WiFi AP 110s, a WLAN associated with the WiFi AP 110s may provide the point of entry to source network 120 via an S2a interface as described in 3GPP TS 23.402. The attachment at stage 303 may provide IP connectivity between UE 105 and source network 120 (e.g. IP connectivity between UE 105 and a PDN Gateway in source network 120) which may be used to transport the signaling described later for stages 304, 307, 308 and 318 and may also be used to establish a voice bearer to convey voice (e.g. VoIP RTP packets) over the source network voice bearer path 140 established at stage 308. In some embodiments, the attachment at stage 303 may be an emergency attach for limited service state—e.g. if UE 105 does not have security credentials (e.g. has no UICC card or no subscription to access source network 120).

Following stage 303, UE 105 may perform an IMS emergency registration (not shown in FIG. 3) with source network 120 and the home network 170 for UE 105 if source network 120 is not the home network 170, as described in 3GPP TS 23.167. The IMS emergency registration may include authenticating the identity of UE 105. In some embodiments, IMS emergency registration may not occur—e.g. if UE 105 has no subscription to a home network 170.

At stage 304, UE 105 may send an emergency call request to source network 120 to establish the emergency call. In some embodiments, the emergency call request may be a SIP INVITE message and may be sent to a P-CSCF (not shown in FIG. 3) in source network 120 which may forward the emergency call request to an E-CSCF for source network 120 (not shown in FIG. 3). The emergency call request may include an emergency number (e.g. "911") or an emergency URN and other information such as an IP address for UE 105 assigned by source network 120 as part of stage 303. The emergency call request may also include an identity for UE 105 which may be a Mobile Station International Subscriber Directory Number (MSISDN), an International Mobile Subscriber Identity (IMSI), an International Mobile Equipment Identity (IMEI) or a public user SIP URI. As part of stage 304, the emergency call request may be forwarded to the anchor point 130 (e.g. may be forwarded by an E-CSCF in source network 120 if the anchor point 130 is an EATF).

At stage 305, anchor point 130 stores information for UE 105 and for the emergency call which may include the identity for UE 105 provided at stage 304 (e.g. an IMSI, MSISDN and/or IMEI). The anchor point 130 also forwards the emergency call to or towards the PSAP 180 at stage 305. For example, the anchor point 130 may forward the emergency call to an E-CSCF (not shown in FIG. 3) in source network 120 which may route the call (e.g. with the assistance of a Location Retrieval Function (LRF), not shown in FIG. 3) to an emergency services network (not shown in FIG. 3) which may route the emergency call to the PSAP 180. If the PSAP 180 is accessed over the CS domain, the emergency call signaling at stage 305 may go through an MGCF (not shown in FIG. 3) in source network 120 prior to being sent to PSAP 180 in order to convert PS (e.g. SIP) based signaling used for stage 304 to and from CS signaling (e.g. SS7 ISDN User Part (ISUP) signaling) used to reach PSAP 180. However, an MGCF may not be needed when PSAP 180 is accessed via the packet switched (PS) domain.

At stage 306, PSAP 180 returns an emergency call response towards the source network 120 which may be an ISUP Answer message if PSAP 180 is accessed via the CS domain or a SIP 200 OK message if the PSAP 180 is accessed via the PS domain. The emergency call response may be returned through the same entities used to send the emergency call request at stage 305 and reaches the anchor point 130. If the PSAP 180 was accessed via the CS domain, an MGCF (not shown in FIG. 3) in source network 120 may convert the emergency call response from a CS based message (e.g. an ISUP Answer message) to a PS based message (e.g. SIP 200 OK message) prior to the message reaching the anchor point 130. The anchor point 130 then forwards the emergency call response back to the UE 105 at stage 307 which may be reached using the same entities used to transfer the emergency call request at stage 304.

As part of stage 307, the anchor point 130 or an intermediate entity for stage 307 (e.g. an E-CSCF or P-CSCF) may include an E-STI in the emergency call response. As described previously (e.g. in association with FIG. 1 and Table 1), the E-STI may be a telephone number, DN, Tel URI, SIP URI, URN, or some other identifier that indicates or identifies the anchor point 130 and optionally the UE 105 and is used later for handover. In some embodiments, a first E-STI may be included in the emergency call response at stage 307 carrying a telephone number or DN and a second E-STI may be included carrying a SIP URI or URN. The E-STI may be referred to by other names—e.g. as a Voice Domain Transfer Number (VDN) or Emergency Session Transfer Number (E-STN) in the case of a telephone number or as a Voice Domain Transfer URI (VDI) in the case of a SIP URI or URN. In one embodiment, an E-STI may not be returned at stage 307 but instead an indication that the source network 120 supports handover of an emergency call may be returned at stage 307. In this embodiment, UE 105 may construct an E-STI based on a known identity (e.g. MCC and MNC) for source network 120—e.g. may construct an E-STI that is a URN as in the example in row C of Table 1.

At stage 308 of signaling flow 300, the remainder of emergency call establishment occurs between the UE 105 and PSAP 180 including establishing the source network voice bearer path 140 between the UE 105 and PSAP 180. For example, when PSAP 180 is IP capable and accessed over the PS domain, the source network voice bearer path 140 can employ IP and RTP to transfer voice traffic without the need for any special intermediate entities. When PSAP 180 is accessed over the CS domain, the source network voice bearer path 140 may go through a Media Gateway (MGW) in source network 120 (not shown in FIGS. 2 and 3) where VoIP to/from UE 105 may be converted to and from CS voice to/from PSAP 180.

At stage 309, the UE 105 moves (e.g. is moved by a user of UE 105) from first location 101 to second location 102 and determines that WiFi radio coverage from WiFi AP 110s is impaired at second location 102 due to being weak or not available. UE 105 also determines at stage 309 that there is cellular radio coverage from BS 115t belonging to target network 125 that is not impaired at second location 102. Following or during the move at stage 309, and based on the impaired WiFi coverage from WiFi AP 110s and the unimpaired cellular coverage from BS 115t, UE 105 decides to instigate handover of the emergency call from WiFi AP 110s to BS 115t using DRVCC. To enable this, at stage 310, UE 105 initiates signaling to BS 115t to attach to target network 125. The attachment may be for a normal call or for an emergency call (e.g. if the E-STI transferred or created at stage 307 indicates handover of an emergency call and UE 105 is unable to attach normally to target network 125). At stage 311, BS 115t may forward the signaling for stage 310 to one or more other entities in target network 125 (e.g. a Mobility Management Entity (MME), a Serving General Packet Radio System Support Node (SGSN), a Mobile Switching Center (MSC) or an Access Manager Function (AMF), not shown in FIG. 3) to continue the attachment. In the case that target network 125 and BS 115t support LTE access or UMTS access in the PS domain, the attachment at stages 310 and 311 may follow procedures defined in 3GPP TS 23.401 or 23.060, respectively. During the attachment at stages 310 and 311, target network 125 may authenticate the identity of UE 105 or there may be no authentication (e.g. if UE 105 has no network subscription or has no UICC card). In the case of no authentication, the attachment at stages 310 and 311 may be an emergency attach as defined in 3GPP TS 23.401 for LTE access or 3GPP TS 23.060 for UMTS PS access. During the attachment at stages 310 and 311, UE 105 may obtain IP connectivity to target network 125 and a new IP address in target network 125 in the case of 5G, LTE or UMTS PS access and may further obtain an emergency PDN connection to a PDN gateway (or other similar gateway in the case of 5G access) in target network 125 (not shown in FIG. 3).

In the case of PS attachment for an emergency services call at stages 310 and 311 (e.g. for LTE access or UMTS PS access by BS 115t for target network 125), UE 105 may perform an IMS emergency registration with target network 125 and home network 170 for UE 105 if target network 125 is not the home network 170, as described in 3GPP TS 23.167 (not shown in FIG. 3). The IMS emergency registration may include authenticating the identity of UE 105. In some embodiments, IMS emergency registration may not occur—e.g. if UE 105 has no subscription to a home network 170.

At stage 312, UE 105 sends a Call Request to target network 125 via BS 115t. The call request may comprise a SIP INVITE message if target BS 115t provides LTE or 5G wireless access to target network 125 or may be a Direct Transfer Application Part (DTAP) SETUP message or DTAP Emergency SETUP message if target BS 115t provides circuit based access to target network 125 using, for example, GSM or UMTS wireless access. The call request includes the E-STI received or created at stage 307—e.g. included as the called party number in the case of CS access to target network 125 or included in the Request-URI and/or To SIP header parameters in the case of PS access using SIP to target network 125. If two E-STIs were returned at stage 307, one containing a telephone number and the other a URN or SIP URI, the telephone number may be included at stage 312 for CS access to target network 125 and the SIP URI or URN may be included for PS access (e.g. using SIP) to target network 125. If only one E-STI was returned or created at stage 307, UE 105 may need to perform conversion from a Tel URI, SIP URI or URN to a telephone number or a telephone number to a Tel URI, SIP URI or URN if this is possible in order to include a called party number at stage 312 for CS access and a Tel URI, SIP URI or URN for PS access. In some embodiments, the E-STI included at stage 312 may indicate a normal call whereas in other embodiments it may indicate an emergency call. The UE 105 may include an identity for UE 105 in the call request at stage 312—e.g. an IMSI, MSISDN or IMEI—or possibly the target network 125 (e.g. a P-CSCF in target network 125) adds this identity to the call request sent at stage 312 if an identity for UE 105 was obtained by target network 125 as part of an IMS emergency registration by UE 105.

The target network 125 (e.g. an E-CSCF in target network 125) uses the E-STI received at stage 312 to route the call at stage 313 to or towards the anchor point 130 in the source network 120. If the attachment at stages 310 and 311 was for an emergency call or provided an emergency PDN connection to UE 105, the attachment at stages 310 and 311 and call reception and routing at stages 312 and 313 may receive priority treatment by target network 125. Furthermore, if the E-STI included at stage 312 indicates an emergency call or handover of an emergency call, the call request at stage 312 may be sent to a P-CSCF and E-CSCF (not shown in FIGS. 2 and 3) in target network 125 with the E-CSCF then forwarding the call to the anchor point 130 in source network 120. In some embodiments, the forwarding may occur at stage 313 even when the UE 105 cannot be authenticated by target network 125 (e.g. has no UICC card).

In an embodiment where a normal attachment occurs at stages 310 and 311 and where a normal call request is sent by UE 105 at stage 312 with 5G access, LTE access or UMTS PS access provided by BS 115t, the attachment at stages 310 and 311 may also involve attaching to the home network 170 for UE 105. In this embodiment, the call request at stage 312 may be sent by UE 105 via the target network 125 to the home network 170 for UE 105 which may then forward the call request using the E-STI to the anchor point 130 in source network 120. In this embodiment, target network 125 actions described here for stages 312, 313, 316 and 317 may be performed by the home network 170 for UE 105 rather than by the target network 125. In addition in this embodiment, the target network signaling path 150 and the target network voice bearer path 155 shown in FIG. 2 may pass through the home network 170 via the extensions 150a and 155a, respectively, described previously for FIG. 2.

If the call request is forwarded at stage 313 as a CS call by the target network 125, the call request may need to be converted at an MGCF (not shown in FIG. 3) in source network 120 into SIP based signaling prior to being sent to anchor point 130, since in some embodiments anchor point 130 may not support CS call signaling. After receiving the call request at stage 313, the anchor point 130 determines that the call request is for UE 105. This determination may be based on an identity for UE 105 (e.g. a local identity originally assigned by anchor point 130 for UE 105 at stage 307) included in the E-STI received at stage 313 and/or may be based on inclusion of a separate identity for UE 105 in the call request (e.g. an MSISDN, IMSI or IMEI that may be included in a From header in the case of SIP signaling) that matches an identity for UE 105 stored by anchor point 130 at stage 305. The anchor point 130 then determines that the call request received at stage 313 is to support a handover of UE 105 and performs an update of the remote call leg at stage 314. The remote leg update at stage 314 provides information to enable handover of the source network voice bearer path 140 to the target network voice bearer path 155. In the case of a PSAP 180 that is IP capable and accessed over the PS domain, the remote leg update at stage 314 can include the sending of a SIP reINVITE message by the anchor point 130 to the PSAP 180 carrying a new IP address of the UE 105 in the target network 125 (e.g. assigned to UE 105 as part of target network 125 attachment at stage 310 and stage 311) to allow the PSAP 180 and UE 105 to later establish the new target voice bearer path 155 at stage 319 as a VoIP path. In the case of a PSAP 180 that is CS capable and accessed over the CS domain from an MGCF (not shown in FIG. 3) in source network 120, the remote leg update at stage 314 can include the sending of a SIP reINVITE message by the anchor point 130 to the MGCF carrying the new IP address of the UE 105 in the target network 125 to allow UE 105 to establish a new target voice bearer path based on IP from UE 105 to an MGW (not shown in FIG. 3) controlled by the MGCF in source network 120 at stage 319.

At stage 315, the PSAP 180 (in the case of a remote leg update at stage 314 to an IP capable PSAP 180) or an MGCF in source network 120 (in the case of a remote leg update to an MGCF in source network 120 with a CS capable PSAP 180) sends a remote leg update response—e.g. a SIP 200 OK message. The anchor point 130 forwards the response to the target network 125 at stage 316 and the target network 125 forwards the response as a call response to the UE 105 at stage 317. If BS 115t in target network 125 provides PS access using 5G, LTE or UMTS, the response may be returned at stages 316 and 317 without transformation—e.g. as a SIP 200 OK message. If the target network 125 provides CS access to UE 106 (e.g. using GSM, UMTS CS mode or CDMA2000 1x), the call response at stage 316 may be converted to a CS related message (e.g. an ISUP Answer message) at an MGCF (not shown in FIG. 3) in source network 120 and may be further transformed (e.g. into a Connect message) by another entity in target network 125 such as an MSC before being returned to UE 105.

Anchor point 130 may then release the source leg of the call established at stage 308 by initiating the release of the portion of the source network signaling path 145 that lies between the anchor point 130 and UE 105. This may be accomplished by the anchor point 130 at stage 318 by sending a release message (e.g. a SIP BYE message) to the UE 105 which may cause UE 105 and intermediate entities (e.g. a P-CSCF and E-CSCF) in source network 120 to release this portion of the source network signaling path 145.

At stage 319, the UE 105 and PSAP 180 may release some or all of the source network voice bearer path 140 and set up the target network voice bearer path 155. Voice traffic between the UE 105 and PSAP 180 may then be diverted to the newly setup target network voice bearer path 155 to preserve voice connectivity between the user of UE 105 and PSAP 180. For an IP capable PSAP 180 and a UE 105 that has IP (e.g. LTE or 5G) wireless access at target network 125, this bearer path change can make use of a new IP address for the UE 105 (e.g. assigned by target network 125 or by the home network 170 at stages 310 and 311) provided to PSAP 180 in the remote leg update at stage 314 which may allow the UE 105 and PSAP 180 to reestablish an RTP session using this new IP address. For a PSAP 180 that is accessed over the CS domain from an MGCF in source network 120 and/or for a UE that has CS access in target network 125 where the CS voice path is converted to VoIP in an MGW in source network 120 or target network 125, the target network voice bearer path 155 can include CS portions and an RTP session may only be needed along portions of the target network voice bearer path 155 that use IP and may then be established using one or two MGWs.

Figure 4:
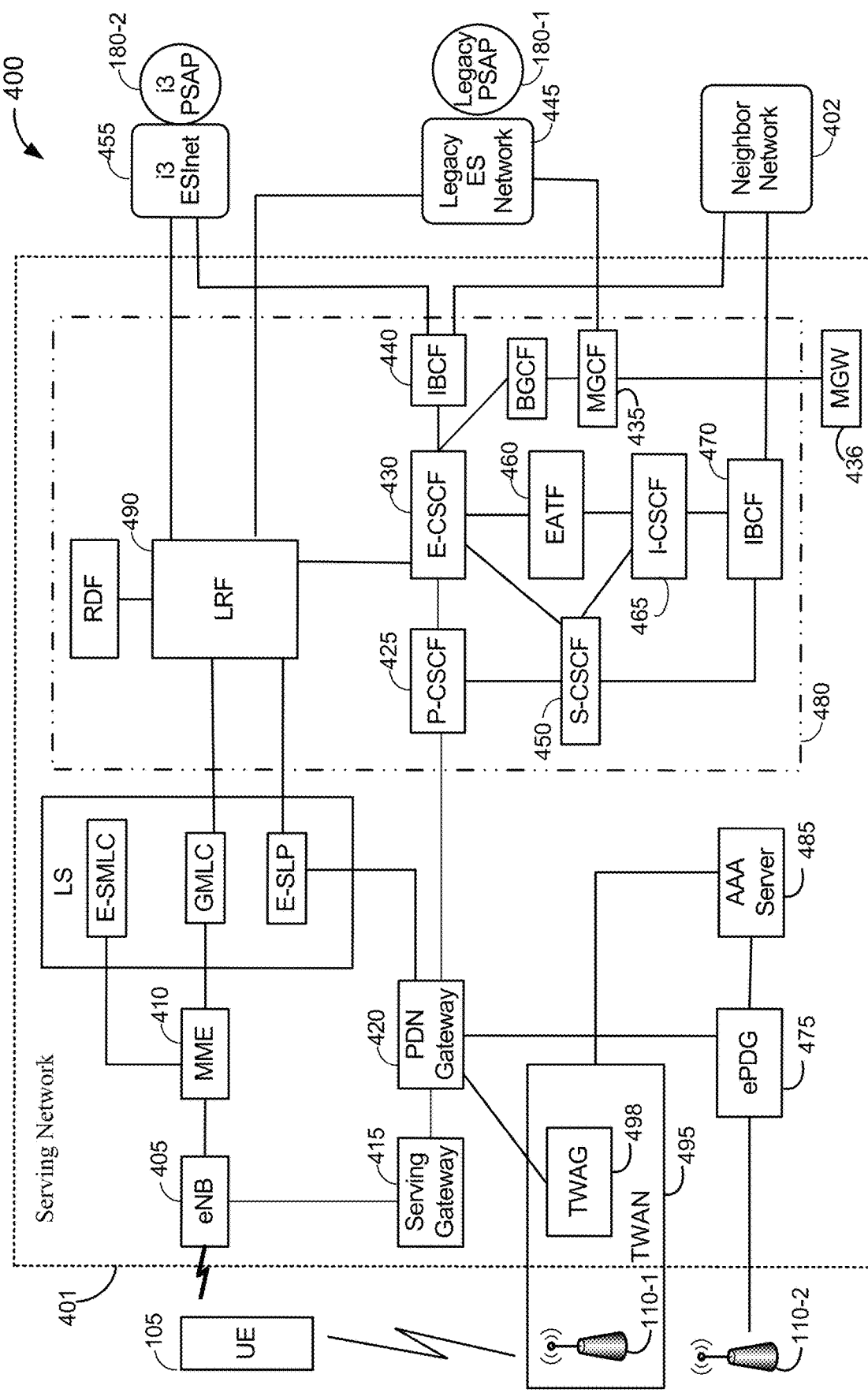
FIG. 4 is a simplified illustration of another communication system capable of handover of an emergency call according to techniques described herein.

FIG. 4 is a simplified block diagram showing a communication system 400 that may be an example (e.g. showing more exemplary details) of the communication system 100 of FIG. 1. Communication system 400 includes the UE 105, a serving network 401 and a neighbor network 402. Serving network 401 may correspond to either source network 120 or target network 125 in communication system 100 and neighbor network 402 may then correspond to the other of source network 120 or target network 125. In the case that serving network 401 does correspond to either source network 120 or target network 125, not all elements shown for serving network 401 may be present (or may be used by UE 105). In the case that neighbor network 402 corresponds to source network 120 or target network 125, neighbor network 402 may contain some or all of the same elements shown in FIG. 4 for serving network 401. While only one UE 105, one eNB 405 and two WiFi APs 110-1 and 110-2 are shown in FIG. 4, there may be many of each of these elements (e.g. thousands or millions of UEs corresponding to UE 105 and hundreds or thousands of eNBs and WiFi APs corresponding to eNB 405 and WiFi APs 110-1 and 100-2, respectively.

In the example in FIG. 4, serving network 401 may provide LTE wireless access to UE 105 via evolved NodeB 405 (also referred to as an eNodeB or eNB) and/or WiFi wireless access to UE 105 via WiFi AP 110-1 or WiFi AP 110-2. ENB 405 may correspond to a base station 115 in communication system 100. Serving network 401 may be referred to as an Evolved Packet System (EPS). Serving network 401 may include a Serving Gateway (SGW) 415, a Packet Data Network (PDN) Gateway 420, a Mobility Management Entity (MME) 410, an evolved Packet Data Gateway (ePDG) 475, an Authentication, Authorization, and Accounting (AAA) Server 485, a Trusted WLAN Access Network (TWAN) 495, a Trusted WLAN Access Gateway (TWAG) 498, a Proxy Call Session Control Function (P-CSCF) 425, an Emergency Call Session Control Function (E-CSCF) 430, a Media Gateway Control Function (MGCF) 435, an Interconnection Border Control Function (IBCF) 440, another IBCF 470 (which may or may not be the same as IBCF 440), a Serving Call Session Control Function (S-CSCF) 450, an Emergency Access Transfer Function (EATF) 460, a Location Retrieval Function (LRF) 490, an Interrogating Call Session Control Function (I-CSCF) 465 and a Media Gateway (MGW) 436.

Communication system 400 also includes a Legacy Emergency Services (ES) Network 445 attached to a Legacy PSAP 180-1, and a National Emergency Number Association (NENA) i3 Emergency Services IP network (ESInet) 455 attached to a NENA i3 capable PSAP 180-2. Legacy PSAP 180-1 may support CS access for emergency calls, whereas i3 PSAP 180-2 may support IP access. The communication system 400 may comprise other components (some of which are shown in FIG. 4 but which are not discussed in this disclosure), and other embodiments may add, omit, join, separate, rearrange, or otherwise alter components depending on desired functionality. Such variations will be recognized by a person of ordinary skill in the art.

The eNB 405 may be a serving eNB for the UE 105 and may provide wireless communications access to the serving network 401 on behalf of UE 105 using LTE. The MME 410 may be a serving MME for the UE 105 and may support mobility of UE 105 and provision of signaling access and voice bearer paths to UE 105. The serving gateway 415 and PDN gateway 420 may provide IP based signaling and IP transport support for UE 105—e.g. with PDN gateway 420 assigning an IP address for UE 105 and providing IP access to other entities in serving network 401 such as P-CSCF 425. The serving gateway 415 may be used when UE 105 has LTE access to serving network 401 via eNB 405. The PDN gateway 420 may be used to support access by UE 105 when UE 105 has LTE access via eNB 405 or WiFi access via WiFi AP 110-1 or WiFi AP 110-2. WiFi AP 110-2 may provide untrusted WiFi access for UE 105 to serving network 401 via ePDG 475. EPDG 475 may support WiFi access to serving network 401 from untrusted WiFi APs such as AP 110-1, may route IP packets between UE 105 and PDN Gateway 420, may support an S2b interface to PDN Gateway 420 as defined in 3GPP TS 23.402 and may tunnel authentication and authorization messages between UE 104 and AAA server 485. WiFi AP 110-2 may provide trusted WiFi access for UE 105 and may be part of a TWAN 495 that may comprise other trusted APs 110. TWAN 495 may be owned and/or managed by the operator of serving network 401 and is therefore shown in FIG. 4 as being partly contained in serving network 401, though, in other embodiments, TWAN 495 may not be part of serving network 401 or may be totally part of serving network 401. In contrast, WiFi AP 110-1 would typically not be part of serving network 401. TWAN 495 includes TWAG 498. TWAG 498 may provide IP access for UE 105 to PDN gateway 420 and may support an S2a interface to PDN Gateway 420 as defined in 3GPP TS 23.402. AAA server 485 may perform authentication and authorization of UE 105 in order to allow UE 105 to access serving network 401 via WiFi APs such as APs 110-1 and 110-2. When serving network 401 is not the home network 170 for UE 105, AAA server 485 may function as a proxy server and may communicate with an AAA server in home network 170 (not shown in FIG. 4) in order to authenticate and authorize UE 105.

Serving network 401 may include an IP Multimedia Subsystem (IMS) 480 that may include the P-CSCF 425, E-CSCF 430, MGCF 435, IBCF 440, IBCF 470, S-CSCF 450, I-CSCF 465, EATF 460 and LRF 490. IMS 480 may support an IMS emergency services call from UE 105 to a PSAP 180 such as i3 PSAP 180-2 or legacy PSAP 180-1 and/or may support handover of an IMS emergency call from source network 120 to target network 125, as described elsewhere here. Elements in IMS 480 may provide call handling and call routing support to enable an IMS emergency services call from UE 105 to either i3 PSAP 180-2 or legacy PSAP 180-1. For example, P-CSCF 425 may detect an IMS emergency services call when instigated by UE 105 (e.g. by receiving, decoding and interpreting a SIP INVITE message sent by UE 105). E-CSCF 430 may support routing of an IMS emergency services call from UE 105 (e.g. by sending a SIP INVITE received via P-CSCF 425 from UE 105 towards either legacy PSAP 180-1 via MGCF 435 or i3 PSAP 180-2 via IBCF 440). LRF 490 may assist routing of an IMS emergency services call from UE 105 when queried by E-CSCF 430. For example, LRF 490 may obtain a location for UE 105 (e.g. from information provided by UE 105 in a SIP INVITE) and may determine a PSAP (e.g. legacy PSAP 180-1 or i3 PSAP 180-2) that supports an emergency services call for that location and may return an identity or address for this PSAP to E-CSCF 430. MGCF 435 may perform conversion of SIP based signaling, received from or sent to UE 105, to or from signaling used by ES network 445 such as Integrated Services Digital Network (ISDN) User Part (ISUP) signaling in the case of an emergency services call to legacy PSAP 180-1. For example, MGCF 435 may convert an IMS emergency services call received from UE 105 into a Circuit Switched (CS) emergency services call in the case of an IMS emergency services call routed to legacy PSAP 180-1. MGCF 435 may be associated with and control MGW 436. MGW 436 may convert between a Voice over IP (VoIP) voice stream (e.g. comprising RTP packets) received from or sent to UE 105 and a CS based voice bit stream sent to or received from legacy PSAP 180-1 in the case of an emergency services call from UE 105 to legacy PSAP 180-1. For example, MGW 436 may be used to support source network voice bearer path 140 in communication system 100 for an emergency call to PSAP 180-1.

IBCF 440 and IBCF 470 in serving network 401 may be used as entry and exit points for IMS based (e.g. SIP) signaling into and out of IMS 480 and may receive and send such signaling from and to, respectively, other networks such as neighbor network 402. I-CSCF 465 may be the initial SIP based signaling entry point that is used to access other SIP servers in IMS 480 such as EATF 460 and S-CSCF 450. I-CSCF 465 may function as a SIP proxy server and route SIP messages incoming from another network (e.g. neighbor network 402) to a suitable server in IMS 480 such as S-CSCF 450 in the case of a normal call terminating to a UE subscriber of serving network 401 or EATF 460 in the case of handover of an emergency call from serving network 401 to another network such as neighbor network 402. In some embodiments, I-CSCF 465 may be combined with IBCF 470. EATF 460 may correspond to anchor point 130 in communication system 100 and may be used to anchor the signaling path of an IMS emergency call instigated in serving network 401 by UE 105. Following handover of an IMS emergency call from serving network 401 to another network such as neighbor network 402, EATF 460 may be used to transfer the source network signaling path (e.g. source network signaling path 145 in communication system 100) into a target network signaling path (e.g. target network signaling path 150 in communication system 100) and may remain a part of both signaling paths. EATF 460 may further convert, or help convert, a source network voice bearer path (e.g. source network voice bearer path 140 in communication system 100) into a target network voice bearer path (e.g. target network voice bearer path 155 in communication system 100) as described further on herein.

I3 ESInet 455 may support IP based emergency calls from UE 105 on behalf of i3 PSAP 180-2—e.g. may route an IP based emergency services call from UE 105 to i3 PSAP 180-2. Legacy ES network 445 may similarly support Circuit Switched (CS) based emergency calls on behalf of legacy PSAP 180-1 received via MGCF 435 from UE 105—e.g. may route a CS emergency services call from UE 105 received via MGCF 435 to legacy PSAP 180-1.

Figure 5:
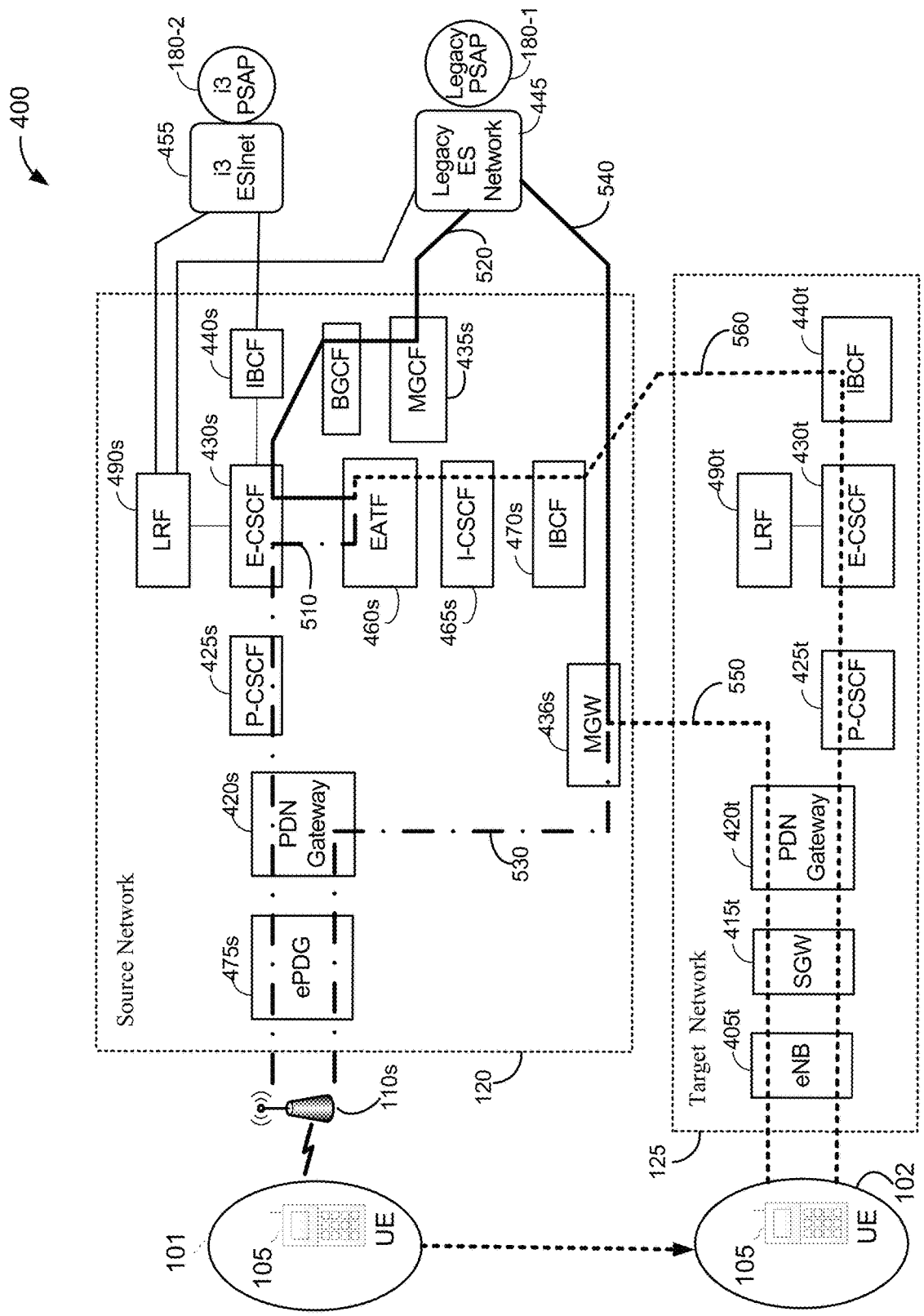
FIG. 5 is an architecture based diagram illustrating handover of an emergency call from WiFi access to cellular access for the communication system of FIG. 4.

FIG. 5, shows more details for instigation and handover of an emergency services call for a particular example of the communication system 400 of FIG. 4. FIG. 5 may be a particular example of some of the handover related features described earlier for FIG. 2. Moreover, not all elements in FIG. 4 are included in FIG. 5 for clarity. In the example of FIG. 5, UE 105 is assumed to have wireless access to untrusted WiFi AP 110-2 (labelled as AP 110s in FIG. 5) for source network 120 at a first location 101 and to have subsequent wireless access to eNB 405 (labelled as eNB 405t in FIG. 5) for target network 125 after moving to a second location 102. As in the case of FIGS. 1-3, to indicate elements of serving network 401 that belong to source network 120 versus target network 125, a subscript "s" or "t", respectively, is used to label such an element. Thus, for example, reference to an E-CSCF 430s refers to an E-CSCF 430 in source network 120 whereas reference to an E-CSCF 430t refers to an E-CSCF 430 in target network 125. For this reason also, untrusted WiFi AP 110-2 is referred to as WiFi AP 110s in FIG. 5 (since the AP is associated with source network 120).

FIG. 5 shows details of the signaling path and voice bearer path for UE 105 both before and after the handover of the emergency services call which may correspond to the signaling path and voice bearer paths for UE 105 shown in FIG. 2. Initially the UE 105 is at the first location 101 and originates an emergency call using WiFi AP 110s to access source network 120 (e.g. after the user of UE 105 dials an emergency number like "911" or "112"). Since WiFi AP 110s is considered not trusted by source network 120, signaling, voice and data from UE 105 are routed to and from other elements in source network 120 via ePDG 475s. In FIG. 5, the emergency call from UE 105 is routed by source network 120 through the EATF 460s (corresponding to the anchor point 130 in FIG. 2) and to the legacy PSAP 180-1. Details of the establishment of the emergency call are described later herein in association with FIG. 6. The signaling path used to establish the emergency call comprises two signaling legs, an incoming signaling leg 510 (shown by an alternating dash and dot line in FIG. 5) and an outgoing signaling leg 520 (shown by a solid line in FIG. 5). The incoming signaling leg 510 and the outgoing signaling leg 520 are connected by the EATF 460s and together correspond to the source network signaling path 145 described in association with FIGS. 2 and 3. The incoming signaling leg 510 is between the UE 105 and EATF 460s, may pass through the AP 110s, ePDG 475s, PDN Gateway 420s, P-CSCF 425s and E-CSCF 430s and may be non-transparent to (e.g. proxied by) P-CSCF 425s and E-CSCF 430s. The outgoing signaling leg 520 is between the EATF 460s and PSAP 180-1, and may pass through and be non-transparent to (e.g. proxied by) the E-CSCF 430s, a BGCF, the MGCF 435s and legacy ES Network 445.

During establishment of the emergency call from UE 105 to PSAP 180-1 via WiFi AP 110s and source network 120, a voice bearer path may be established between UE 105 and PSAP 180-1 which may convey speech traffic between UE 105 and PSAP 180. In FIG. 5, the voice bearer path comprises two voice bearer legs, an incoming voice bearer leg 530 (shown by an alternating dash and dot line in FIG. 5) and an outgoing voice bearer leg 540 (shown by a solid line in FIG. 5). The incoming voice bearer leg 530 and the outgoing voice bearer leg 540 are connected by the MGW 436s and together correspond to the source network voice bearer path 140 described in association with FIGS. 2 and 3. The incoming voice bearer leg 530 is between the UE 105 and MGW 436s and may pass through the AP 110s, ePDG 475s and PDN Gateway 420s. The outgoing voice bearer leg 540 is between the MGW 436s and PSAP 180-1 and may pass through the legacy ES Network 445 as well as one or more other intermediate entities (not shown in FIG. 5) such as a selective router. On the incoming voice bearer leg 530, voice traffic may be transferred as VoIP (e.g. using RTP), whereas on the outgoing voice bearer leg 540, voice traffic may be transferred in CS form (e.g. using Pulse Code Modulation (PCM) A-law or ρ-law). The difference in voice traffic on the incoming and outgoing voice bearer legs may be due to UE 105 and source network 120 supporting VoIP but PSAP 180-1 supporting only CS voice, thereby necessitating conversion by MGW 436s.

At some later time, UE 105 may move from the first location 101 to the second location 102. At second location 102, wireless coverage from WiFi AP 110s may not be present or may be very weak but cellular coverage from eNB 405t belonging to target network 125 may be available. Accordingly, the emergency call from UE 105 to PSAP 180-1 may need to handover from WiFi AP 110s to eNB 405t. To support the handover, signaling may be exchanged between UE 105, target network 125 and source network 120 (e.g. EATF 460s in source network 120). Details of the handover and of the signaling that may be used to support it are provided later in association with FIG. 7. The signaling interactions to support the handover may use the incoming signaling leg 510, the outgoing signaling leg 520 and a new target network signaling leg 560 (shown by the dotted line in FIG. 5). The new target network signaling leg 560 may be between the UE 105 and EATF 460s, may pass through the eNB 405t, Serving Gateway (SGW) 415t, PDN Gateway 420t, P-CSCF 425t, E-CSCF 430t, IBCF 440t, IBCF 470s and I-CSCF 465s and may be non-transparent to (e.g.

proxied by) P-CSCF 425t, E-CSCF 430t, IBCF 440t, IBCF 470s and I-CSCF 465s. All three signaling legs may converge at (e.g. be joined by) EATF 460s. Following handover, the incoming signaling leg 510 may be released by UE 105 and EATF 460s leaving target network signaling leg 560 and outgoing signaling leg 520 which may together correspond to target network signaling path 150 in FIGS. 2 and 3.

During the handover, a new target network voice bearer leg 550 (shown by a dotted line in FIG. 5) may be established between UE 105 and MGW 436s. The new target network voice bearer leg 550 may pass through the eNB 405t, Serving Gateway (SGW) 415t and PDN Gateway 420t. Following handover, the incoming voice bearer leg 530 may be released by UE 105 and MGW 436s, resulting in voice transfer between UE 105 and PSAP 180-1 using the target network voice bearer leg 550 and the outgoing voice bearer leg 540 which may together correspond to target network voice bearer path 155 in FIGS. 2 and 3 (e.g. for the embodiment where target network voice signaling path 155 does not bypass source network 120). Similarly to the initially established emergency call prior to handover, voice traffic may be transferred as VoIP (e.g. using RTP) over the target network voice bearer leg 550 but may be transferred in CS form (e.g. using PCM A-law or μ-law) over the outgoing voice bearer leg 540.

PSAP 180-1 may not be involved in the handover shown in FIG. 5 and may not receive or send any additional signaling or change support for the voice transport over the outgoing voice bearer leg 540 which may exist in unchanged form both before and after the handover.

FIG. 5 exemplifies just one type of handover from a WiFi AP to LTE access and using a legacy PSAP 180-1. The scope of FIG. 5 may thus be more limited than FIG. 2 but additional details are provided that show how the handover can be supported. In an embodiment where handover occurs as shown in FIG. 5 from WiFi AP 110s in source network 120 to eNB 405t in target network 125 but with an emergency call to i3 PSAP 180-2 instead of legacy PSAP 180-1, certain aspects of the signaling and voice bearer paths may be different. Specifically, incoming signaling leg 510 may remain the same as in FIG. 5, but outgoing signaling leg 520 may be different and may proceed from EATF 460s to E-CSCF 430s, to IBCF 440s, to i3 ESInet 455 and thence to PSAP 180-2 and may be used both before and after the handover. In the case of the voice bearer path, incoming voice bearer leg 530 and outgoing voice bearer leg 540 may be replaced by a first voice bearer path that proceeds from UE 105 to AP 110s, to ePDG 475s, to PDN Gateway 420s and thence to i3 ESInet 455 and i3 PSAP 180-2 (e.g. via the Internet 195). The first voice bearer path may correspond to source network voice bearer path 140 in FIG. 2. Following handover, the first voice bearer path may be replaced by a second voice bearer path that proceeds from UE 105 to eNB 405t, to SGW 415t, to PDN Gateway 420t and thence to i3 ESInet 455 and i3 PSAP 180-2. The second voice bearer path may correspond to target network voice bearer path 155 in FIG. 2

Figure 6:
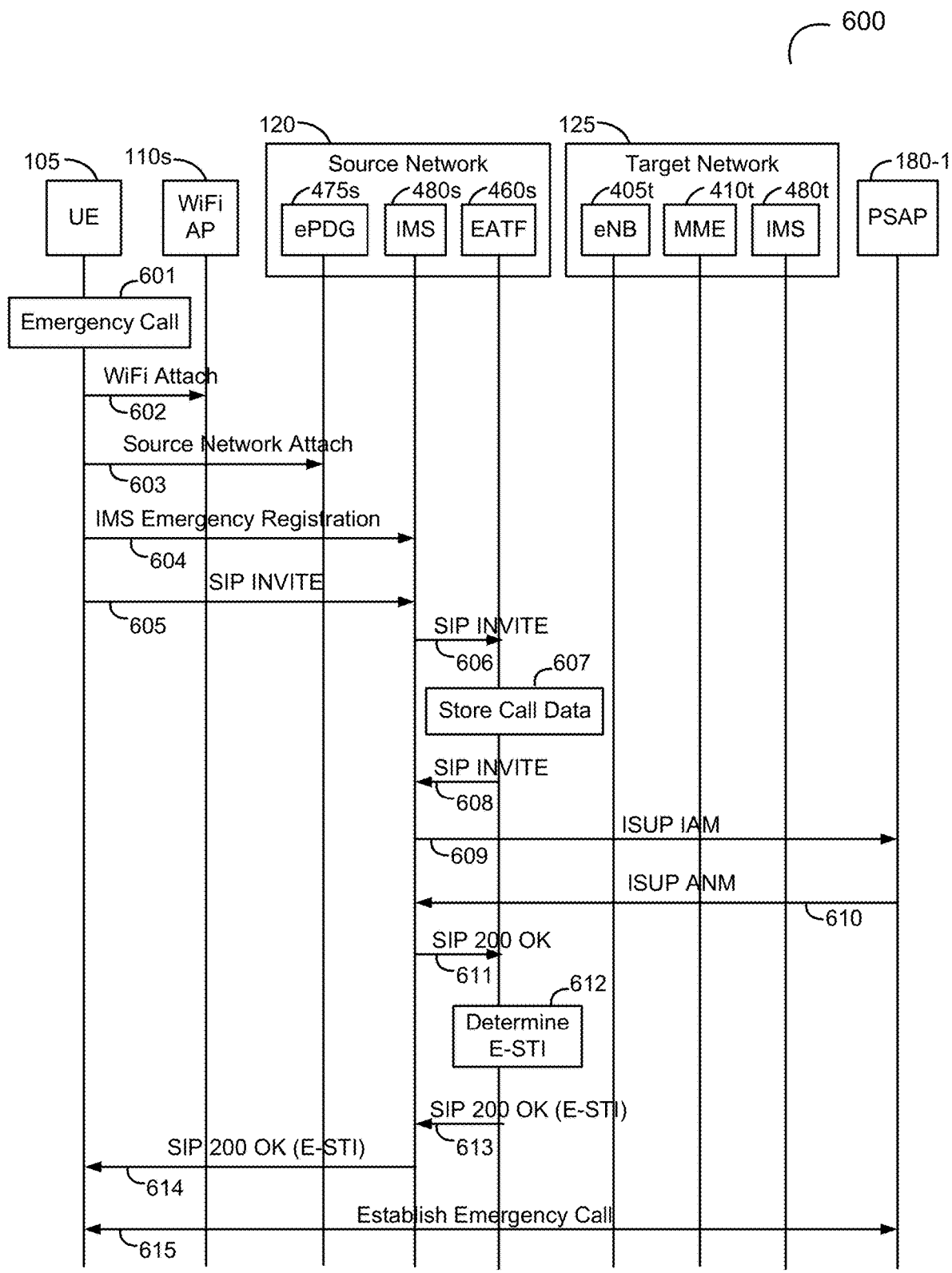
FIG. 6 is a signaling flow illustrating origination of an emergency call using WiFi access for the communication system of FIG. 4.

FIG. 6 shows a signaling flow 600 which may be used to establish an emergency call for the communication system 400 and according to the various features of handover shown in FIG. 5. Signaling flow 600 may correspond to stages 301 to 308 in signaling flow 300 in some embodiments. Signaling flow 600 may use the incoming signaling leg 510 in FIG. 5 to support signaling for stages 602-606 and 613-615 and the outgoing signaling leg 520 in FIG. 5 to support signaling for stages 608-611 and stage 615. When describing certain actions or stages in signaling flow 600 (and signaling flow 700 described later for FIG. 7), reference is made to IMS 480s in source network 120 or IMS 480t in target network 125 (or certain entities within IMS 480s or IMS 480t) sending or receiving messages to or from, respectively, some other entity E which may in fact be also part of IMS 480s or IMS 480t according to the communication system 400 shown in FIG. 4. The intent in such cases is to describe communication within IMS 480s or IMS 480t between the entity E and other entities in IMS 480s or 480t by treating the other entity E as being (e.g. temporarily) separate from IMS 480s or IMS 480t.

Initially the UE 105 is at first location 101 for signaling flow 600. The user of UE 105 (or some automatic process on UE 105 such a process triggered by sensors) then invokes an emergency call at stage 601—e.g. by dialing the digits "911" in the case of user invocation. If the UE 105 is not already associated with (e.g. registered with) WiFi AP 110s, UE 105 associates with (e.g. attaches to and/or registers with) WiFi AP 110s at stage 602. UE 105 then attaches to source network 120 via the WiFi AP 110s at stage 603. For example, UE 105 first selects source network 120 based on configuration information in UE 105 and/or based on a DNS query to find a source network able to support an emergency call via an untrusted WiFi AP for the country in which UE 105 is located. In some cases, source network 120 may be the home network 170 for UE 105—e.g. if first location 101 is in the home country for UE 105. After selecting the source network 120, UE 105 may use the address of source network 120 (e.g. an MCC and MNC for source network 120) to determine an address for ePDG 475s and may then attach to ePDG 475s and PDN Gateway 420s (not shown in FIG. 6) and obtain IP connectivity and an IP address from PDN Gateway 420s. The attachment at stage 603 may provide IP connectivity between UE 105 and source network 120 (e.g. IP connectivity between UE 105 and a PDN Gateway 420s in source network 120) which may be used to transport the signaling described later for stages 604, 605, 614 and 615 and may also be used to establish a voice bearer to convey voice (e.g. VoIP RTP packets) over the incoming voice bearer leg 530 established at stage 615 as described later. In some embodiments, the attachment at stage 603 may be an emergency attach for limited service state—e.g. if UE 105 does not have security credentials (e.g. has no UICC card) or has no network subscription to access source network 120. The attachment at stage 603 may be according to 3GPP TS 23.402 in some embodiments.

At stage 604, UE 105 may perform an IMS Emergency Registration with IMS 480s (e.g. with P-CSCF 425s and possibly S-CSCF 450s) in source network 120 and with the home network 170 (e.g. with an S-CSCF in home network 170, not shown in FIG. 6) for UE 105 if source network 120 is not the home network 170, and as described in 3GPP TS 23.167. The IMS Emergency Registration may include authenticating the identity of UE 105 (e.g. an IMSI or MSISDN). In some embodiments, IMS emergency registration at stage 604 may not occur—e.g. if UE 105 has no subscription to a home network 170 or if home network 170 does not support IMS Emergency Registration for a UE 105 roaming in a network different to home network 170.

If an IMS Emergency Registration is performed successfully at stage 604, IMS 480s (e.g. P-CSCF 425s or S-CSCF 450s) may delay deregistering UE 105 if and when UE 105 performs a new IMS emergency registration described later for stage 705 in FIG. 7 in order to allow the handover procedure described for FIG. 7 to complete successfully. The delay in deregistering may comprise retaining registration state information for UE 105 for a short period (e.g. one minute) after an indication is received (e.g. at S-CSCF 450s if source network 120 is the same as home network 170) that UE 105 is using a new IP contact address for an IMS emergency call, or after an indication is received (e.g. at P-CSCF 425s from home network 170) that UE 105 is no longer registered. The delay in deregistering may not be needed if IMS 480s (e.g. P-CSCF 425s) does not subscribe to receiving an update (e.g. a SIP NOTIFY message) from home network 170 indicating a change in UE 105 emergency registration status.

At stage 605, UE 105 may send a SIP INVITE message to IMS 480s in source network 120 to establish the emergency call. The SIP INVITE message may be sent initially to P-CSCF 425s in IMS 480s (not shown in FIG. 6), which may forward the SIP INVITE to E-CSCF 430s in IMS 480s (also not shown in FIG. 6). The SIP INVITE may include an emergency number (e.g. "911") or an emergency URN and other information such as an IP address for UE 105 assigned by PDN Gateway 420s as part of stage 603. The SIP INVITE may also include an identity for UE 105 which may be an MSISDN, IMSI, IMEI or a public user SIP URI.

At stage 606, IMS 480s (e.g. E-CSCF 430s) forwards the SIP INVITE to EATF 460s. EATF 460s may function as the anchor point 130 described for FIGS. 2 and 3. At stage 607, EATF 460s may store information for the UE 105 and for the emergency call such as the IP address and an identity for UE 105 (e.g. an IMSI, MSISDN, IMEI or SIP public user ID) and information for the incoming signaling leg 510 and outgoing signaling leg 520 such as the address of the next entity along either signaling path which may typically be E-CSCF 430s.

At stage 608, EATF 460s forwards the SIP INVITE back to IMS 480s (e.g. to E-CSCF 430s in IMS 480s). IMS 480s (e.g. E-CSCF 430s in IMS 480s) may then obtain routing information for the call, such as by querying LRF 490s (not shown in FIG. 6) which may obtain location information for UE 105 (e.g. from an E-SLP or from an E-SMLC via a Gateway Mobile Location Center (GMLC) and MME 410s) and use the location information to determine the destination PSAP 180 or some intermediate entity en route to the destination PSAP 180 (e.g. in legacy ES Network 445). Since in this example the destination PSAP 180 is legacy PSAP 180-1 which uses CS signaling, IMS 480s (e.g. E-CSCF 430s) may forward the SIP INVITE to an MGCF 435s in IMS 480s (not shown in FIG. 6) and may include routing information in the SIP INVITE such as address or identifier for legacy PSAP 180-1. IMS 480s (e.g. MGCF 435s) then sends a CS emergency call request to or towards legacy PSAP 180-1 at stage 609. In this example (and as shown in FIG. 6), the CS emergency call request is an ISUP Initial Address Message (IAM).

Legacy PSAP 180-1 may send a CS call proceeding message such as an ISUP Address Complete Message (ACM) back to IMS 480s (e.g. MGCF 435s) which may return a corresponding SIP call proceeding message (e.g. a SIP 180 message) back to UE 105 via EATF 460s (not shown in FIG. 6). When legacy PSAP 180-1 (e.g. an operator at PSAP 180-1) answers the call, legacy PSAP 180-1 returns an ISUP Answer message (ANM) to IMS 480s (e.g. to MGCF 435s in IMS 480s) at stage 610. Within IMS 480s, MGCF 435s may then send an equivalent SIP 200 OK message to E-CSCF 430s (not shown in FIG. 6) and IMS 480s (e.g. E-CSCF 430s) then forwards the SIP 200 OK message to EATF 460s at stage 611.

At stage 612, EATF 460s determines an E-STI. As described previously in association with Table 1 and FIG. 1, the E-STI may be a SIP URI, URN, telephone number (e.g.

ITU E.164 telephone number), a Tel URI or some other identifier. The E-STI may identify source network 120, EATF 460s and/or UE 105. For example, the E-STI may include an identity for UE 105 which may be a global identity (e.g. an IMSI, MSISDN or IMEI) received in the SIP INVITE at stage 606 or a local identity for UE 105 assigned or created by EATF 460s. The E-STI may further indicate an emergency call and/or handover of an emergency call. EATF 460s may store the determined E-STI at stage 612 or any local identifier created for UE 105 by EATF 460s as part of the E-STI. EATF 460s then sends the SIP 200 OK message received at stage 611 back to IMS 480s (e.g. to E-CSCF 430s) at stage 613 and includes the E-STI determined at stage 612. IMS 480s then returns the SIP 200 OK message with the E-STI to UE 105 at stage 614—e.g. which may comprise sending the SIP 200 OK message from E-CSCF 430s in IMS 480s to P-CSCF 425s with P-CSCF 425s then sending the SIP 200 OK to UE 105.

In one embodiment, EATF 460s does not determine an E-STI at stage 612 but instead includes an indication in the SIP 200 OK message sent at stage 613 and stage 614 that EATF 460s supports handover of an emergency services call using DRVCC from one network operator to a different network operator. In this embodiment, UE 105 would create an E-STI (e.g. an E-STI identifying source network 120) as described previously in association with FIG. 1 and Table 1. In another embodiment, EATF 460s determines two E-STIs at stage 612—a first E-STI comprising a telephone number or DN and a second E-STI comprising a SIP URI or URN. Each E-STI may identify source network 120, EATF 460s and/or UE 105 and may indicate an emergency call or handover of an emergency call. EATF 460s may then returns both E-STIs to UE 105 in the SIP 200 OK message sent at stage 613 and 614.

At stage 615 of signaling flow 600, the remainder of emergency call establishment occurs between the UE 105 and PSAP 180 including establishing the incoming voice bearer leg 530 and outgoing voice bearer leg 540 between the UE 105 and PSAP 180-1 via MGW 436s. In the example of FIG. 6, legacy PSAP 180-1 uses CS signaling, so the incoming voice bearer leg 530 between UE 105 and MGW 436s transports VoIP (e.g. in the form of RTP packets) and the outgoing voice bearer leg 540 between MGW 436s and legacy PSAP 180-1 transports CS voice (e.g. using PCM), as described for FIG. 5.

Figure 7:
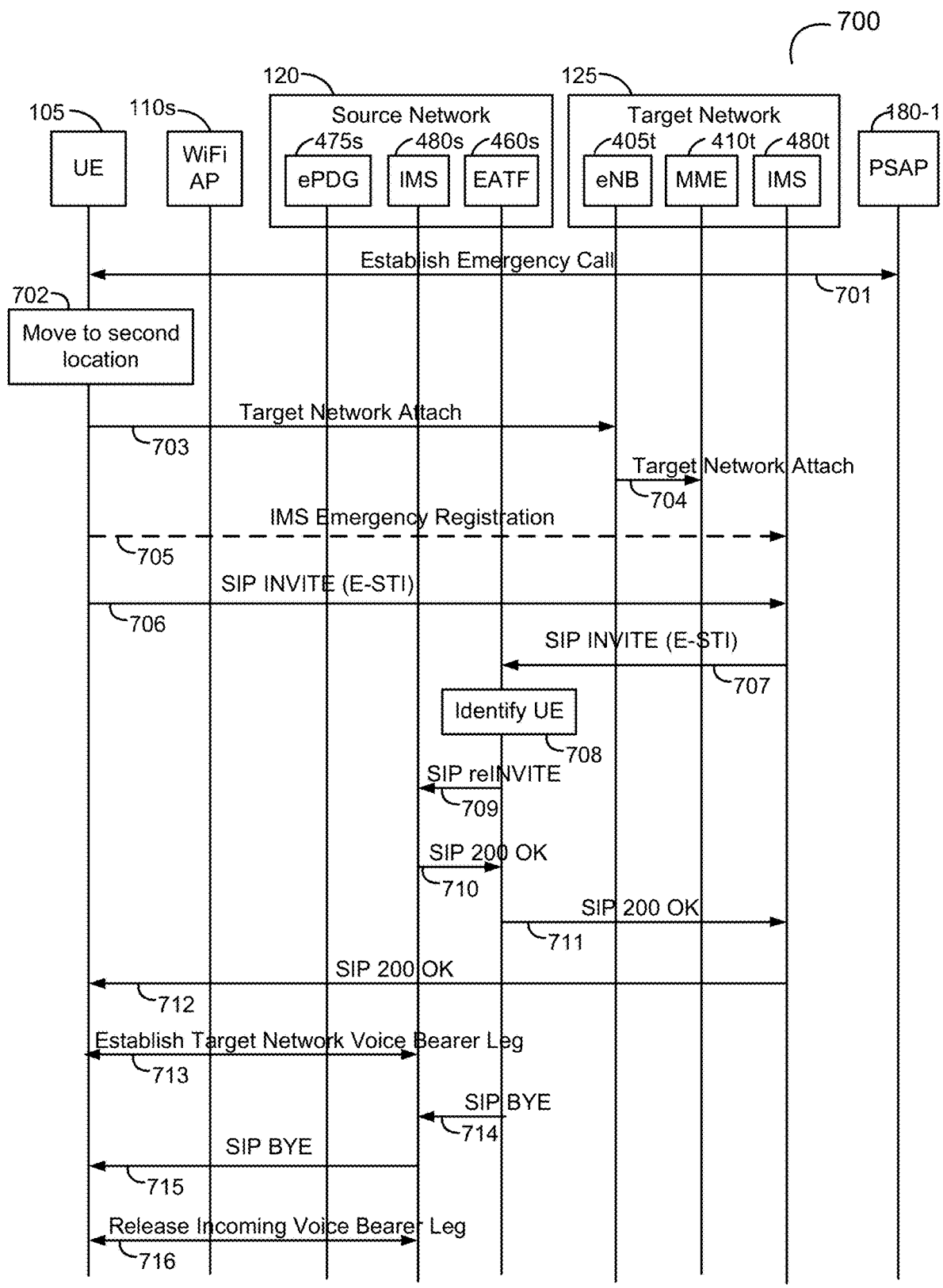
FIG. 7 is a signaling flow illustrating handover of an emergency call from WiFi access to cellular access for the communication system of FIG. 4.

FIG. 7 shows a signaling flow 700 which may be used to handover an emergency call for the communication system 400 and according to the various features of handover shown in FIG. 5. Signaling flow 700 may correspond to stages 309 to 319 in signaling flow 300 in some embodiments. Signaling flow 700 may use the target network signaling leg 560 in FIG. 5 to support signaling for stages 705-707 and 711-712, the outgoing signaling leg 520 in FIG. 5 to support signaling for stages 709-710 and the incoming signaling leg 510 in FIG. 5 to support signaling for stages 714-715.

Initially UE 105 is at first location 101 and establishes an IMS emergency call to legacy PSAP 180-1 at stage 701. Stage 701 is assumed to correspond to stages 601-615 of signaling flow 600 in FIG. 6. At stage 702, UE 105 moves (e.g. is moved by a user of UE 105) from first location 101 to second location 102 and determines that WiFi radio coverage from WiFi AP 110s is impaired (e.g. at second location 102 due to being weak or not available. UE 105 also determines at stage 702 that there is LTE cellular coverage from eNB 405t belonging to target network 125 that is not impaired (e.g. at second location 102). Following or during the move at stage 702, and based on the impaired WiFi coverage from WiFi AP 110s and the unimpaired LTE cellular coverage from eNB 405t, UE 105 decides to instigate handover of the emergency call from WiFi AP 110s to a cell supported by eNB 405t using DRVCC. To enable this, at stage 703, UE 105 initiates signaling to eNB 405t to request attachment to target network 125. The attachment may be for a normal call or for an emergency call (e.g. if the E-STI transferred to UE 105 at stage 614 or created by UE 105 if no E-STI is transferred indicates handover of an emergency call and UE 105 is unable to attach normally to target network 125). At stage 704, eNB 405t forwards the attachment request to MME 410t to continue the attachment. Further signaling may occur as part of stages 703 and 704 between UE 105, eNB 405t and MME 410t to complete the attachment. The attachment at stages 703 and 704 may follow procedures defined in 3GPP TS 23.401 for LTE access. During the attachment at stages 703 and 704, MME 410t may authenticate the identity of UE 105 or there may be no authentication (e.g. if UE 105 has no network subscription or has no UICC card). In the case of no authentication, the attachment at stages 703 and 704 may be an emergency attach as defined in 3GPP TS 23.401 for LTE access. During the attachment at stages 703 and 704, UE 105 may obtain IP connectivity to a PDN Gateway 420t in target network 125 (not shown in FIG. 7) and a new IP address in target network 125 (e.g. assigned by PDN Gateway 420t).

Optionally (e.g. if UE 105 is authenticated by MME 410s during the attachment at stages 703 and 704), UE 105 may perform an IMS emergency registration at stage 705 with IMS 480t in target network 125 (e.g. with a P-CSCF 425t in IMS 480t (not shown in FIG. 7)) and with home network 170 for UE 105 if target network 125 is not the home network 170. The IMS emergency registration at stage 705 may be as described in 3GPP TS 23.167 and 3GPP TS 24.229. The IMS emergency registration may include authenticating the identity of UE 105. In some embodiments, IMS emergency registration may not occur at stage 705—e.g. if UE 105 has no subscription to a home network 170.

At stage 706, UE 105 sends a SIP INVITE to IMS 480t in target network 125 via eNB 405t and PDN Gateway 420t. For example, the SIP INVITE may be sent to a P-CSCF 425t in IMS 480t (not shown in FIG. 7). The SIP INVITE includes the E-STI received by UE at stage 614 or created by UE 105 if no E-STI was received at stage 614. The E-STI may be a URN, SIP URI or Tel URI. If UE 105 received an E-STI at stage 614 that is a telephone number or DN, UE 105 may convert the E-STI into a Tel URI. If UE 105 received two E-STIs at stage 614, one of which is a URN or SIP URI and the other a telephone number or DN, UE 105 includes the E-STI that is a URN or SIP URI in the SIP INVITE at stage 706. The E-STI may be included in a Request-URI SIP header and/or in a SIP To header in the SIP INVITE message. The UE 105 may also include an IP address for UE 105 assigned (e.g. by PDN Gateway 420t) at stages 703 and 704 and an identity for UE 105 (e.g. an MSISDN or SIP public user ID) in the SIP INVITE sent at stage 706. Alternatively or in addition, the target network 125 (e.g. a P-CSCF 425t in target network 125) may add an identity for UE 105 to the SIP INVITE sent at stage 706 (e.g. an IMSI, MSISDN, IMEI or SIP public user ID) which may be included in a SIP P-Asserted-Identity header in the SIP INVITE. An identity added for UE 105 by target network 125 (e.g. a P-CSCF 425t) may have been obtained by target network 125 from UE 105 or from home network 170 (e.g. an S-CSCF in home network 170) as part of an IMS emergency registration at stage 705 if stage 705 occurs.

The SIP INVITE including the E-STI sent at stage 706 may be forwarded within IMS 480*t*—e.g. may be forwarded by a P-CSCF 425*t* to an E-CSCF 430*t* in IMS 480*t* (not shown in FIG. 7). During the forwarding, an identity for UE 105, such as a SIP public user ID or an MSISDN may be added to the SIP INVITE (e.g. by a P-CSCF 425*t*). Forwarding of the SIP INVITE within IMS 480*t* may be based on the E-STI indicating an emergency call rather than a normal call. The IMS 480*t* (e.g. an E-CSCF 430*t* in IMS 480*t*) may use the E-STI received at stage 706 to route the SIP INVITE including the E-STI at stage 707 to EATF 460*s* in the source network 120. The SIP INVITE may be routed to EATF 460*s* at stage 707 via IBCF 440*t* in target network 125 and/or via IBCF 470*s* and/or I-CSCF 465*s* in source network 120 (not shown in FIG. 7). Routing of the SIP INVITE to the source network 120 rather than to a PSAP 180 may be based on an indication of handover of an emergency call by the E-STI received at stage 706. In particular, while IMS 480*t* may normally route a SIP INVITE containing a Tel URI, URN or SIP URI that indicates an emergency call directly to or towards a PSAP 180 (e.g. as described for stages 608 and 609 of signaling flow 600), an indication of handover of an emergency call by the E-STI may cause IMS 480*t* (e.g. E-CSCF 430*t* in IMS 480*t*) to route the SIP INVITE to a source network for the emergency call indicated by the E-STI (in this case source network 120).

After receiving the SIP INVITE including the E-STI at stage 707, the EATF 460*s* determines that the SIP INVITE is for UE 105 by identifying UE 105 at stage 708. In one embodiment, the identification may be based on the received E-STI (included in the SIP INVITE) if an E-STI containing an identity for UE 105 was determined by EATF at stage 612. In this embodiment, EATF 460*s* may attempt to match the received E-STI with the E-STI determined and stored by EATF 460*s* at stage 612 if the E-STI was stored at stage 612. Alternatively in this embodiment, EATF 460*s* may attempt to match an identity for UE 105 included in the received E-STI with an identity for UE 105 stored by EATF 460*s* at either stage 607 (e.g. in the case of a global identity such as an IMSI, MSISDN, IMEI or SIP public user ID) or at stage 612 (e.g. in the case of a local identity for UE 105 assigned by EATF 460*s* at stage 612) that was included by EATF 460*s* in the E-STI determined at stage 612. In another embodiment, the identification may be based in addition or alternatively on inclusion of an identity for UE 105 (e.g. an MSISDN, IMSI, IMEI or SIP public user ID) in the SIP INVITE received at stage 707 (e.g. in a SIP From header or SIP P-Asserted-Identity header) that may have been included by UE at stage 706 or by an entity in IMS 480*t* (e.g. P-CSCF 425*t*) during transfer of the SIP INVITE within IMS 480*t* following stage 706 as previously described. In this embodiment, the EATF 460*s* may attempt to match the received identity for UE 105 with an identity for UE 105 previously stored by EATF 460*s* at stage 607. In either embodiment, if the attempted match succeeds (i.e. the received identity for UE 105 or the received E-STI matches a stored identity for UE 105 or a stored E-STI), EATF 460*s* may identify UE 105. The EATF 460*s* then determines that the SIP INVITE received at stage 707 is to support a handover of UE 105.

At stage 709, The EATF 460*s* sends a SIP reINVITE message to the IMS 480*s* (e.g. to E-CSCF 430*s* in IMS 480*s*), The SIP reINVITE message may instigate an update of the outgoing signaling leg (also referred to as the remote call leg in FIG. 3) in order to handover the voice path from the incoming voice bearer leg 530 to the target network voice bearer leg 550. The SIP reINVITE message sent at stage 709 may include the new IP address of the UE 105 in the target network 125 (e.g. assigned at stages 703 and 704 by PDN Gateway 420*t*). The IMS 480*s* (e.g. E-CSCF 430*s*) may internally forward the SIP reINVITE message to MGCF 435*s* (not shown in FIG. 7) to allow MGCF 435*s* to instruct MGW 436*s* controlled by MGCF 435*s* to establish, or to be ready to establish, the new target network voice bearer leg 550 to UE 105 at stage 713 as described later. MGCF 435*s* may then return a SIP 200 OK message internally within IMS 480*s* (e.g. to E-CSCF 430*s*) (not shown in FIG. 7). IMS 480*s* (e.g. E-CSCF 430*s*) may forward the SIP 200 OK message to EATF 460*s* at stage 710. EATF 460*s* may then forward the SIP 200 OK message to IMS 480*t* (e.g. to E-CSCF 430*t*) in target network 125 at stage 711. The forwarding at stage 711 may be via I-CSCF 465*s* and/or IBCF 470*s*. IMS 480*t* may internally forward the SIP 200 OK (e.g. from E-CSCF 430*t* to P-CSCF 425*t*) (not shown in FIG. 7). IMS 480*t* (e.g. P-CSCF 425*t*) may then forward the SIP 200 OK message to UE 105 at stage 712.

At stage 713, UE 105 and MGW 436*s* controlled by MGCF 435*s* in IMS 480*s* may establish the target network voice bearer leg 550 shown in FIG. 5 between UE 105 and MGW 436*s* (via target network 125).

At stage 714, EATF 460*s* may initiate release of the incoming signaling leg 510 and incoming voice bearer leg 530 by sending a SIP BYE message to IMS 480*s* (e.g. to E-CSCF 430*s* which may transfer the SIP BYE message to P-CSCF 425*s*). IMS 480*s* (e.g. P-CSCF 425*s*) may then send the SIP BYE message to UE 105 at stage 715. IMS 480*s* (e.g. MGW 436*s* under the control of MGCF 435*s*) and UE 105 may then release the incoming voice bearer leg 530 at stage 716. UE 105 and MGW 436*s* may then transfer voice traffic (e.g. as sent and received on outgoing voice bearer leg 540) using the new target network voice bearer leg 550. Dual radio support by UE 105, whereby UE 105 supports signaling access using WiFi to source network 120 via AP 110*s* and simultaneous signaling access using LTE to target network 125 via eNB 405*t*, may be needed in this example starting at stage 703 when UE 105 attaches to target network 125 and ending at stage 716 after UE 105 transfers voice traffic to the new target network voice bearer leg 550. Because of the dual radio support, the type of handover exemplified in FIG. 7 may be referred to as Dual Radio Voice Call Continuity (DRVCC) as mentioned previously.

Although FIGS. 6 and 7 assume that the emergency call from UE 105 is routed by IMS 480*s* (e.g. by E-CSCF 430*s*) to legacy PSAP 180-1 at stage 609, the techniques described for FIGS. 6 and 7 may be equally applicable to an alternative embodiment whereby the emergency call from UE 105 is routed by IMS 480*s* to i3 PSAP 180-2. In this alternative embodiment, the various stages described previously for FIGS. 6 and 7 may continue to apply with certain stages replaced or modified as follows. First, a SIP INVITE message rather than an ISUP IAM message may be sent at stage 609 from IMS 480*s* (e.g. E-CSCF 430*s*) to i3 PSAP (e.g. via i3 ESInet 455). Second, a SIP 200 OK message rather than an ISUP ANM message may be sent at stage 610 from i3 PSAP 480-2 (e.g. via i3 ESInet 455) to i3 IMS 480*s* (e.g. E-CSCF 430*s*). Third, for the remainder of emergency call establishment at stage 615, MGW 436*s* may not be used to establish separate incoming and outgoing voice bearer legs 530 and 540 and instead a single voice bearer path through source network 120 may be established between the UE 105 and i3 PSAP 180-2 which may pass through AP 110*s*, ePDG 475*s* and PDN Gateway 420*s* which may transport VoIP (e.g.

RTP packets) between UE 105 and i3 PSAP 180-2 with no conversion to or from CS voice. In addition, following stage 709, IMS 480s (e.g. E-CSCF 430s) may forward the SIP reINVITE received at stage 709 to i3 PSAP 180-2 (e.g. via ESInet 455) after which, i3 PSAP 180-2 may return a SIP 200 OK message back to IMS 480s (e.g. E-CSCF 430s) (e.g. via ESInet 455) which is then forwarded by IMS 480s (e.g. E-CSCF 430s) to EATF 460s at stage 710. Then at stage 713, UE 105 and i3 PSAP 180-2 may establish a new voice bearer path through target network 125 supporting VoIP transfer which may pass through eNB 405t, SGW 415t and PDN Gateway 420t. Finally at stage 716, UE and i3 PSAP 180-2 may switch VoIP transfer from the initial voice bearer path through source network 120 to the new voice bearer path through target network 125. In this embodiment, incoming and outgoing voice bearer legs 530 and 540 and target network voice bearer leg 550 may not be established or used.

In some embodiments, to enable provision of an accurate location for UE 105 to a PSAP 180 for the example shown in FIGS. 6 and 7 and in the case of an emergency call to legacy PSAP 180-1, the ISUP IAM sent at stage 609 may include an identification for LRF 490s as well as an identification for UE 105. The identification may be an Emergency Services Routing Key (ESRK) parameter or may be an Emergency Services Routing Digits (ESRD) parameter combined with an MSISDN for UE 105, as defined in American National Standards Institute (ANSI) standard J-STD-036-C. An ESRK may identify both the LRF 490s and UE 105, whereas an ESRD may identify just the LRF 490s with the MSISDN identifying the UE 105. Following stage 615, PSAP 180-1 may send a location request for UE 105 to LRF 490s based on the identity (e.g. ESRK or ESRD) for LRF 490s and may include the identity of UE 105 (e.g. ESRK or MSISDN) in the location request. LRF 490s may then obtain a location for UE 105 (e.g. as described in 3GPP TS 23.167) using a user plane location solution with an E-SLP in source network 120 and return the location to PSAP 180-1.

Following handover of the emergency call from source network 120 to target network 125 at stages 702-716 in signaling flow 700, PSAP 180-1 may still need to obtain the location of UE 105 (e.g. if a location was not obtained prior to the handover or if the location of UE 105 has changed as may be typical when a handover occurs). To support such continuity of location, PSAP 180-1 may continue to send a location request or a further location request to LRF 490s as just described. However, because UE 105 is now accessing target network 125 rather than source network 120, LRF 490s may not be able to obtain a location for UE 105 using an E-SLP belonging to source network 120. Instead, LRF 490s may forward the location request to LRF 490t in target network 125 which may obtain a location for UE 105 using a control plane location solution with an MME 410t and a GMLC and E-SMLC in target network 125 or using a user plane location solution with an E-SLP in target network 125. To enable forwarding of the location request, the address of LRF 490t may be transferred to LRF 490s during the handover procedure via inclusion in the SIP INVITE message sent at stages 707 and 709 in signaling flow 700. In an embodiment, the address of LRF 490s may comprise a location by reference for UE 105 (also referred to as a location URI) which may by assigned by LRF 490t and transferred to IMS 480t (e.g. E-CSCF 430t)—e.g. if IMS 480t (e.g. E-CSCF 430t) queries LRF 490t following stage 706 for a location by reference for UE 105. IMS 480t may then include the location by reference in the SIP INVITE sent at stage 707 to EATF 460s. The location by reference may be associated with a location dereferencing protocol such as SIP or the HTTP-Enabled Location Delivery (HELD) protocol defined in IETF RFC 5985. EATF 460s may forward the location by reference in the SIP reINVITE sent to IMS 480s (e.g. E-CSCF 430s) at stage 709 and IMS 480s (e.g. E-CSCF 430s) may pass the location by reference to LRF 490s. Following a query for the location of UE 105 from PSAP-1 to LRF 490s at a later time after stage 716, LRF 490s may query LRF 490t for the location of UE 105 using the location dereferencing protocol associated with the location by reference.

In the case that the emergency call established in signaling flow 600 is sent to i3 PSAP 180-2 in the alternative embodiment described previously, continuity of location for UE 105 may be supported in a different manner. In this case, IMS 480t (e.g. E-CSCF 430t) may query LRF 490t following stage 706 for a location by reference for UE 105 as before and may include the location by reference in the SIP INVITE sent at stage 707 to EATF 460s. As before, the location by reference may be associated with a location dereferencing protocol such as SIP or HELD. EATF 460s may then forward the location by reference in the SIP reINVITE sent to IMS 480s (e.g. E-CSCF 430s) at stage 709 and IMS 480s (e.g. E-CSCF 430s) may transfer the location by reference to i3 PSAP 180-2 in the SIP reINVITE forwarded by IMS 480s to *i*3 PSAP 180-2 following stage 709 that was described above for the alternative embodiment. I3 PSAP 180-2 may then query LRF 490t in target network 125 directly for the location of UE 105 using the dereferencing protocol associated with the location by reference. This may avoid continuing to support location of UE 105 at LRF 490s following stage 716 including avoiding transferring a location request from LRF 490s to LRF 490t.

FIGS. 6 and 7 exemplify an emergency call wherein a voice media path is initially established between UE 105 accessing a source network 120 and a PSAP 180 at stage 615 in signaling flow 600 which later undergoes handoff to a target network 125 at stages 713 and 716 in signaling flow 700. However, the techniques exemplified in FIGS. 6 and 7 are equally applicable to establishment and handover of an emergency call which uses other media paths such as a media path for video and/or a media path for text which may be established instead of or in addition to a media path for voice. In such cases, the alternative or additional media path(s) may also be established as part of stage 615 and may also undergo handoff as part of stages 713 and 716. The additional or alternative media path(s) may pass through exactly the same entities as described for the voice media path and may comprise similar incoming, outgoing and target network media path legs as described for the voice media path in association with FIGS. 5-7. In some embodiments of an emergency call to legacy PSAP 180-1, the additional or alternative media path(s) may not always be supported when the emergency call is initially established in source network 120 (e.g. at stage 615 in signaling flow 600), since conversion of IP based signaling to CS based signaling at MGW 436s may not always be possible or supported by legacy ES network 445 or legacy PSAP 180-1. In other embodiments, the additional or alternative media path(s) may be supported in source network 120 when the emergency call is initially established (e.g. at stage 615 in signaling flow 600), but may not be supported by target network 125—e.g. when target network 125 supports CS access (e.g. using GSM or UMTS wireless access), in which case, handover of a voice bearer path may be possible as described in signaling flow 700 but not handover of the additional or alternative media paths which may be released at stage 716. In alternative embodiments of an emergency call to i3 PSAP 180-2, the additional or alternative media path(s) may be supported if supported by i3 PSAP 180-2.

Figure 8:
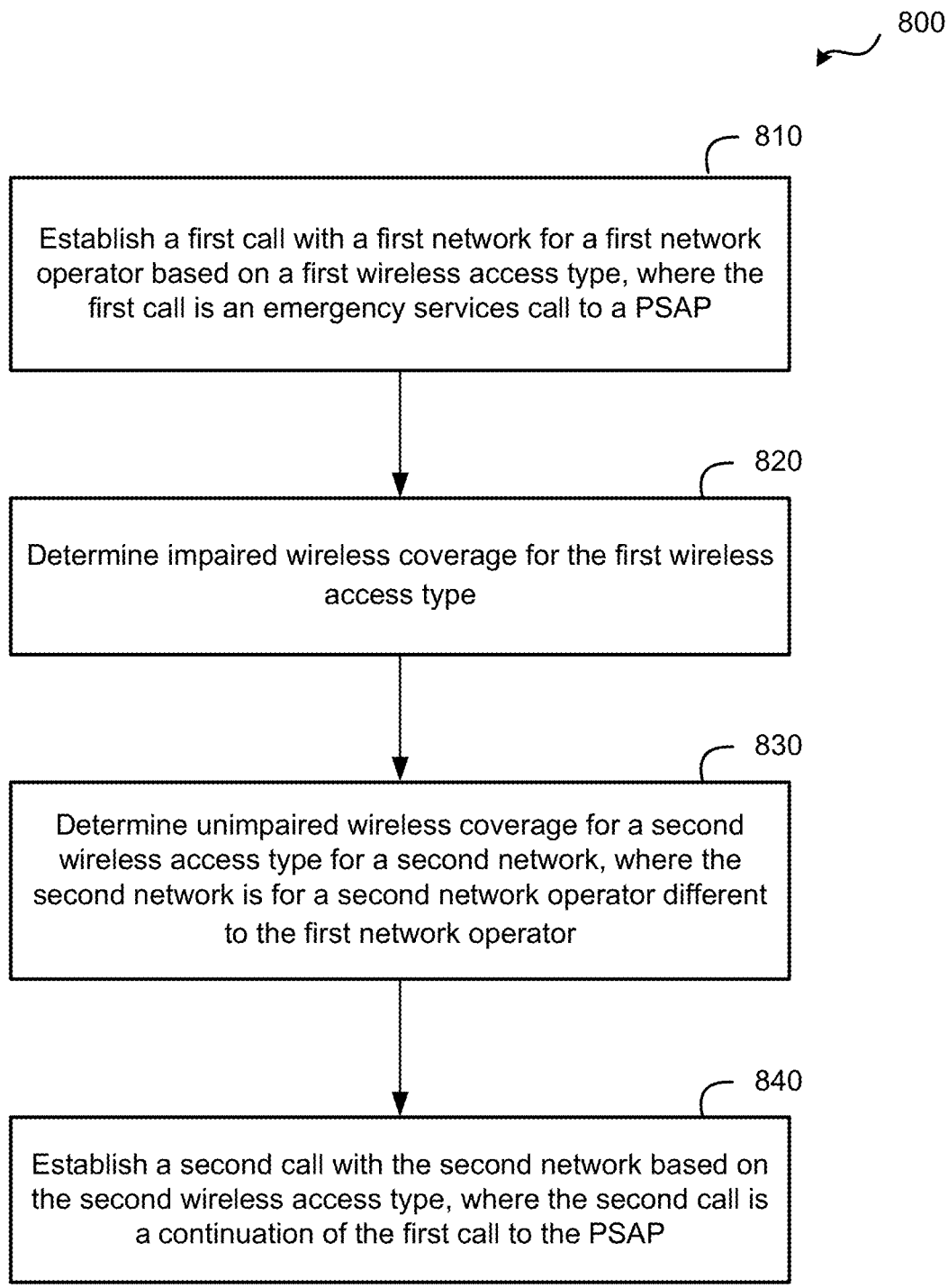
FIG. 8 is a flow chart showing exemplary support for the techniques described herein at a UE.

FIG. 8 is a flow diagram illustrating a method 800 of supporting handoff of an emergency services call, according to an embodiment. It can be noted that, as with figures appended hereto, FIG. 8 is provided as a non-limiting example. Other embodiments may vary, depending on desired functionality. For example, the functional blocks illustrated in method 800 may be combined, separated, or rearranged to accommodate different embodiments. The method 800 may be performed by a UE such as the UE 105 of FIGS. 1-7. Means for performing the functionality of method 800 may include hardware and/or software means of a UE, such as the architecture 1100 for UE 105 shown in FIG. 11.

Method 800 may start at block 810, where the UE establishes a first call with a first network for a first network operator based on a first wireless access type and where the first call is an emergency services call to a PSAP. The first network may correspond to source network 120 in some embodiments. Block 810 may correspond to stages 301 to 308 of signaling flow 300 and/or to stages 601 to 615 of signaling flow 600 in certain embodiments. The UE may be at a first location when performing block 810.

At block 820, the UE determines impaired wireless coverage for the first wireless access type. For example, the UE may have moved or been moved (e.g. by a user of the UE) from a first location for block 810 to a second location, different to the first location. Alternatively, radio coverage for the first wireless type may have changed for other reasons (e.g. due to signal fading or a power outage for a radio transceiver associated with the first wireless access type).

At block 830, the UE determines unimpaired wireless coverage for a second wireless access type for a second network, where the second network is for a second network operator different to the first network operator. For example, if the UE has moved from a first location for block 810 to a second location for block 820, wireless coverage for the second wireless access type may be unimpaired at the second location. The second network may correspond to target network 125 in some embodiments. In different embodiments, block 830 may occur before, at the same time as or after block 820. Block 820 and/or block 830 may correspond to stage 309 of signaling flow 300 and/or to stage 702 of signaling flow 700 in certain embodiments.

At block 840, the UE establishes a second call with the second network based on the second wireless access type, where the second call is a continuation of the first call to the PSAP. Block 840 may correspond to stages 310 to 319 of signaling flow 300 and/or to stages 703 to 716 of signaling flow 700 in certain embodiments.

In certain embodiments, the first wireless access type and the second wireless access type may be one of Long Term Evolution (LTE), Global System for Mobile Communications (GSM), Universal Mobile Telecommunications System (UMTS), Fifth Generation (5G), New Radio (NR) or IEEE 802.11 WiFi.

In certain embodiments, the first wireless access type is different to the second wireless access type. For example, the first wireless access type may be WiFi and the second wireless access type may be LTE or 5G.

In an embodiment, the UE receives an E-STI from the first network based on establishing the first call—e.g. as at stage 307 for signaling flow 300 or stage 614 for signaling flow 600. The E-STI may comprise a Telephone Number (or a Directory Number), a Session Initiation Protocol (SIP) Uniform Resource Identifier (URI), a Telephone Number (Tel) URI or a Universal Resource Name (URN). The E-STI may further comprise an indication of a network entity for the first network (e.g. an indication of an EATF such as EATF 460s for signaling flow 600), an indication of the UE, an indication of a handoff of an emergency services call or an indication of some combination of these—e.g. as described herein in association with Table 1.

In an embodiment, establishing the second call at block 840 comprises sending a message to the second network, the message comprising the E-STI. In an embodiment, the message is a SIP INVITE message, a Direct Transfer Application Part (DTAP) SETUP message or a DTAP Emergency SETUP message. In an embodiment, the second call is an emergency services call.

Figure 9A:
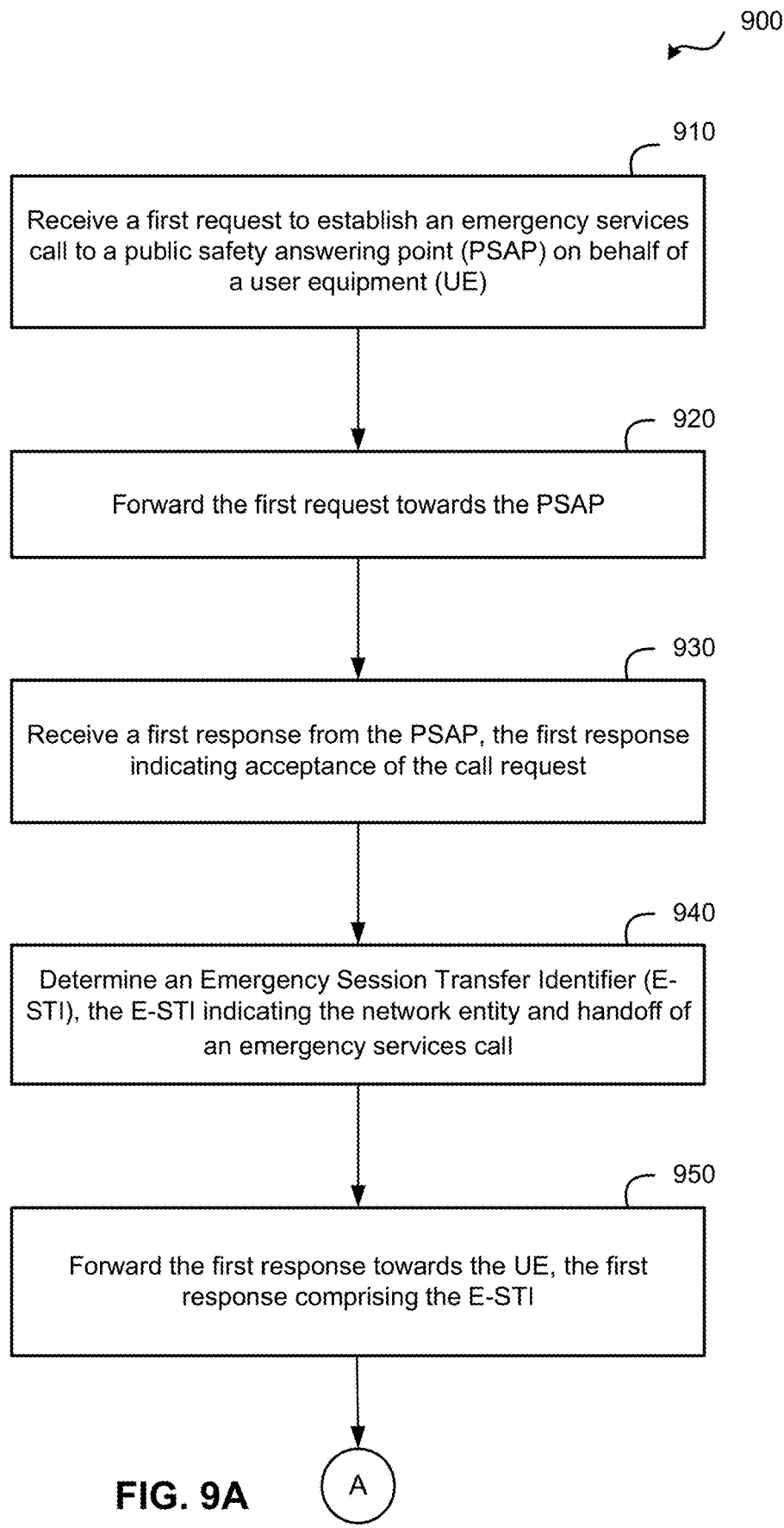
FIGS. 9A, 9B, and 10 are flow charts showing exemplary support for the techniques described herein at a network entity.
Figure 9B:
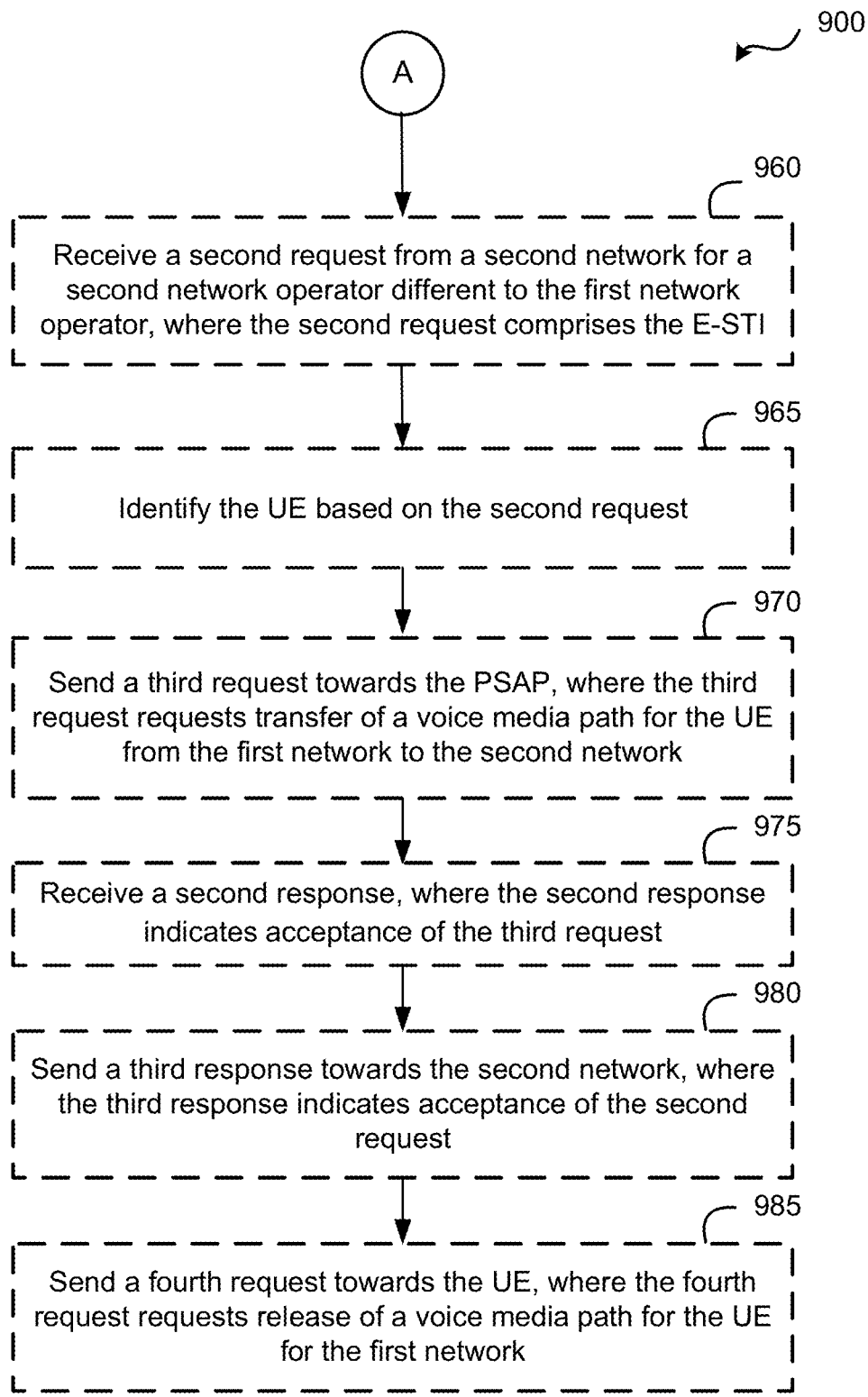

FIG. 9A and FIG. 9B are flow diagrams illustrating a method 900 of supporting handoff of an emergency services call, according to an embodiment. The flow diagram in FIG. 9B continues the flow diagram in FIG. 9A. It can be noted that, as with figures appended hereto, FIGS. 9A and 9B are provided as a non-limiting example. Other embodiments may vary, depending on desired functionality. For example, the functional blocks illustrated in method 900 may be combined, separated, or rearranged to accommodate different embodiments. The method 900 may be performed by a network entity in a first network for a first network operator. The network entity may be an EATF (e.g. EATF 460s) and/or may correspond to anchor point 130 in FIGS. 2 and 3. The first network may correspond to source network 120 in some embodiments. Means for performing the functionality of method 900 may include hardware and/or software means of a computer system, such any of devices 1202, 1204 and 1206 for FIG. 12. In FIGS. 9A and 9B, optional operations are indicated with dashed lines.

Method 900 may start at block 910, where the network entity receives a first request to establish an emergency services call to a PSAP (e.g. a PSAP 180) on a behalf of a UE (e.g. UE 105). In certain embodiments, the first request is a SIP INVITE message. Block 910 may correspond to stage 304 of signaling flow 300 and/or to stage 606 of signaling flow 600 in certain embodiments.

At block 920, the network entity forwards the first request towards the PSAP. Block 920 may correspond to stage 305 of signaling flow 300 and/or to stage 608 of signaling flow 600 in certain embodiments.

At block 930, the network entity receives a first response from the PSAP (e.g. which may be received one or more intermediate entities), where the first response indicates acceptance of the call request (e.g. by the PSAP). In certain embodiments, the first response is a SIP 200 OK message. Block 930 may correspond to stage 306 of signaling flow 300 and/or to stage 611 of signaling flow 600 in certain embodiments.

At block 940, the network entity determines an Emergency Session Transfer Identifier (E-STI). The E-STI may indicate (e.g. may identify) the network entity and may indicate handoff of an emergency services call. The E-STI may further identify the UE. The E-STI may comprise a Telephone Number (or a Directory Number), a SIP URI, a Tel URI or a URN. Block 940 may correspond to stage 612 of signaling flow 600 in certain embodiments.

At block 950, the network entity forwards the first response towards the UE, and includes the E-STI in the first response. Block 950 may correspond to stage 307 of signaling flow 300 and/or to stage 613 of signaling flow 600 in certain embodiments.

At block 960, which is an optional block and follows block 950, the network entity receives a second request from a second network for a second network operator different to the first network operator, where the second request comprises the E-STI. The second request may be a SIP INVITE message in some embodiments. The second network may correspond to target network 125 in some embodiments. Receiving the second request may correspond to stage 313 in signaling flow 300 and/or to stage 707 in signaling flow 700 in some embodiments.

At block 965, which is an optional block, the network entity identifies the UE based on the second request. Identifying the UE may correspond to stage 708 in signaling flow 700 in some embodiments.

At block 970, which is an optional block, the network entity sends a third request towards the PSAP, where the third request requests transfer of a voice media path for the UE from the first network to the second network. The third request may be a SIP reINVITE message in some embodiments. Sending of the third request may correspond to stage 314 of signaling flow 300 and/or to stage 709 of signaling flow 700 in certain embodiments.

At block 975, which is an optional block, the network entity receives a second response (e.g. responsive to the third request) indicating acceptance of the third request. The second response may be a SIP 200 OK message in some embodiments. Receiving the second response may correspond to stage 315 of signaling flow 300 and/or to stage 710 of signaling flow 700 in certain embodiments.

At block 980, which is an optional block, the network entity sends a third response (e.g. responsive to the second response) towards the second network, where the third response indicates acceptance of the second request. The third response may be a SIP 200 OK message in some embodiments. Sending the third response may correspond to stage 316 of signaling flow 300 and/or to stage 711 of signaling flow 700 in certain embodiments.

At block 985, which is an optional block, the network entity sends a fourth request (e.g. responsive to the second response) towards the UE, where the fourth request requests release of a voice media path for the UE for the first network. The fourth request may be a SIP BYE message in some embodiments. Sending the fourth request may correspond to stage 318 of signaling flow 300 and/or to stage 714 of signaling flow 700 in certain embodiments.

In certain embodiments, the first network and the second network support wireless access for the UE using one of Long Term Evolution (LTE), Global System for Mobile Communications (GSM), Universal Mobile Telecommunications System (UMTS), Fifth Generation (5G), New Radio (NR) or IEEE 802.11 WiFi. In certain embodiments, the wireless access supported for the UE by the first network is different to the wireless access supported for the UE by the second network.

Figure 10:
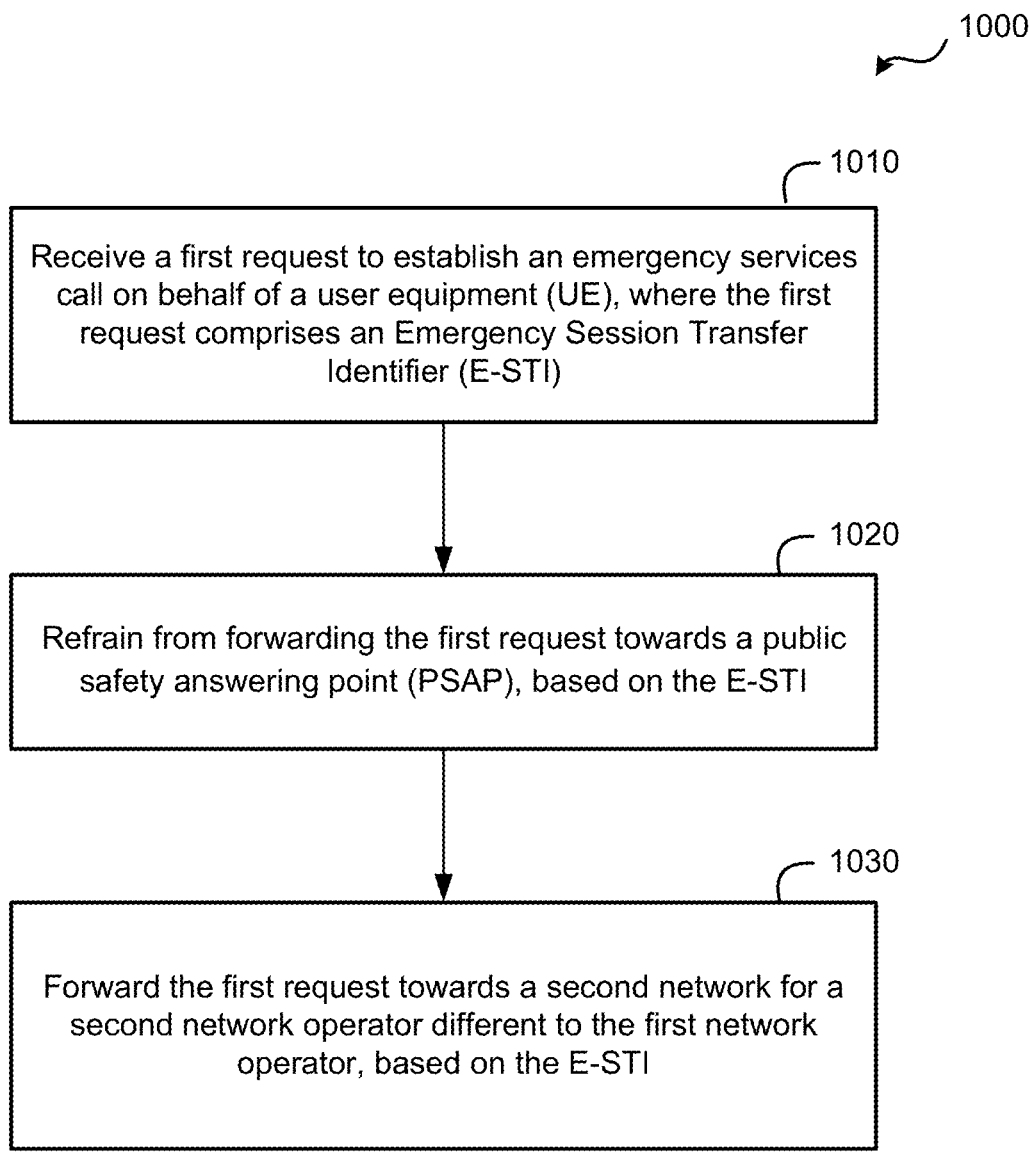

FIG. 10 is a flow diagram illustrating a method 1000 of supporting handoff of an emergency services call, according to an embodiment. It can be noted that, as with figures appended hereto, FIG. 10 is provided as a non-limiting example. Other embodiments may vary, depending on desired functionality. For example, the functional blocks illustrated in method 1000 may be combined, separated, or rearranged to accommodate different embodiments. The method 1000 may be performed by a network entity in a first network for a first network operator. The network entity may be an E-CSCF (e.g. E-CSCF 430t). The first network may correspond to target network 125 in some embodiments. Means for performing the functionality of method 1000 may include hardware and/or software means of a computer system, such any of devices 1202, 1204 and 1206 for FIG. 12.

Method 1000 may start at block 1010 where the network entity receives a first request to establish an emergency services call on behalf of a UE (e.g. UE 105), where the first request comprises an Emergency Session Transfer Identifier (E-STI). The first request may be a SIP INVITE message, a DTAP SETUP message or a DTAP emergency SETUP message. Block 1010 may correspond to stage 312 of signaling flow 300 and/or to stage 706 of signaling flow 700 in certain embodiments.

At block 1020, the network entity refrains from forwarding the first request towards a PSAP, based on the E-STI. For example, the E-STI may indicate an emergency services call which may normally cause the network entity to forward the request to or towards a PSAP (e.g. a PSAP 180). However, the E-STI may also indicate handover of an emergency call which may cause the network entity to not forward the request to a PSAP.

At block 1030, the network entity forwards the first request towards a second network for a second network operator different to the first network operator, based on the E-STI. The second network may correspond to source network 120 in some embodiments. Block 1030 may correspond to stage 313 of signaling flow 300 and/or to stage 707 of signaling flow 700 in certain embodiments.

In certain embodiments of method 1000, the E-STI comprises a telephone number (or directory number), SIP URI, a Tel URI or a URN. The E-STN may further comprise an indication of a second network entity for the second network, an indication of a handoff of an emergency services call or an indication of both, where the forwarding of the first request to the second network at block 1030 is based on the indication. The second network entity may be an EATF (e.g. EATF 460s for FIGS. 6-7) and/or may correspond to anchor point 130 for FIGS. 2-3.

In some embodiments, the first network and the second network support wireless access for the UE using one of Long Term Evolution (LTE), Global System for Mobile Communications (GSM), Universal Mobile Telecommunications System (UMTS), Fifth Generation (5G), New Radio (NR) or IEEE 802.11 WiFi. In some embodiments, the wireless access supported for the UE by the first network is different to the wireless access supported for the UE by the second network.

Figure 11:
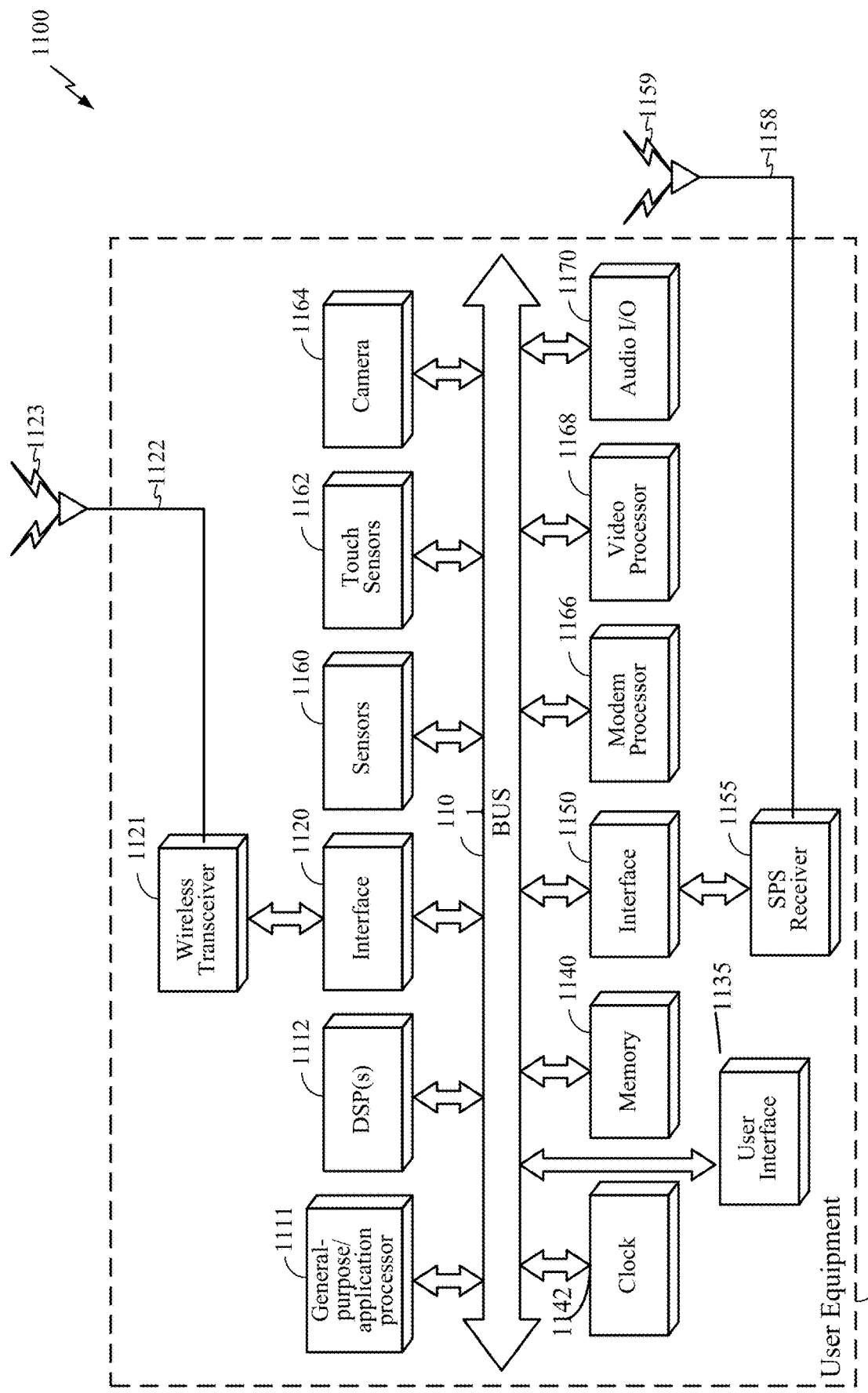
FIG. 11 is a schematic block diagram illustrating an exemplary UE, in accordance with an implementation.

FIG. 11 is a schematic diagram of an architecture 1100 showing internal hardware and software components of the UE 105 for FIGS. 1-8 according to an embodiment. In certain embodiments, UE 105 may comprise a wireless transceiver 1121 which is capable of transmitting and receiving wireless signals 1123 via wireless antenna 1122 over a wireless communication network. Wireless transceiver 1121 may be connected to bus 1101 by a wireless transceiver bus interface 1120. Wireless transceiver bus interface 1120 may, in some embodiments be at least partially integrated with wireless transceiver 1121. Some embodiments may include multiple wireless transceivers 1121 and wireless antennas 1122 to enable transmitting and/or receiving signals according to a corresponding multiple wireless communication standards such as, for example, versions of IEEE 802.11, CDMA, WCDMA, LTE, UMTS, GSM, 5G, NR, AMPS, Zigbee and Bluetooth, just to name a few examples.

UE 105 may further comprise a clock 1142 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 1142 may comprise registers, oscillators, input terminals output terminals, etc. capable of providing values indicative of a clock state. In particular embodiments, a clock state maintained at clock 1142 may be used to control processes to execute application functions on in a coordinated fashion on general purpose/application processor 1111, Digital Signal Processor(s) (DSP(s)) 1112, etc. As pointed out above, a clock state maintained at clock 1142 may be synchronized with clock states maintained by devices other than UE 105.

UE 105 may also comprise SPS receiver 1155 capable of receiving and acquiring SPS signals 1159 via SPS antenna 1158 (which may be the same as or different to wireless antenna 1122). SPS receiver 1155 may also process, in whole or in part, acquired SPS signals 1159 for estimating a location of UE 105. In some embodiments, general-purpose processor(s) 1111, memory 1140, DSP(s) 1112 and/or specialized processors (not shown) may also be utilized to process acquired SPS signals, in whole or in part, and/or calculate an estimated location of UE 105, in conjunction with SPS receiver 1155. Storage of SPS or other signals for use in performing positioning operations may be performed in memory 1140 or registers (not shown).

Also shown in FIG. 11, UE 105 may comprise DSP(s) 1112 connected to the bus 1101 (e.g. by a bus interface not shown in FIG. 11), general-purpose processor(s) 1111 connected to the bus 1101 (e.g. by a bus interface not shown in FIG. 11) and memory 1140. In a particular implementation, a bus interface may be integrated with the DSP(s) 1112, general-purpose processor(s) 1111 and memory 1140. In various embodiments, functions may be performed in response to execution of one or more machine-readable instructions stored in memory 1140 such as on a computer-readable storage medium, such as RAM, ROM, FLASH, or disc drive, just to name a few example. The one or more instructions may be executable by general-purpose processor(s) 1111, specialized processors, or DSP(s) 1112. Memory 1140 may comprise a non-transitory processor-readable memory and/or a computer-readable memory that stores software code (programming code, instructions, etc.) that are executable by processor(s) 1111 and/or DSP(s) 1112 to perform functions described herein. General-purpose processor(s) 1111 and/or DSP(s) 1112 may execute instructions to execute one or more aspects of processes discussed above such as the method 800 in FIG. 8.

Also, a user interface 1135 may comprise any one of several devices such as, for example, a speaker, microphone, display device, vibration device, keyboard, touch screen, just to name a few examples. In a particular implementation, user interface 1135 may enable a user to interact with one or more applications or functions hosted on UE 105—e.g. such as invoking an emergency services call. For example, devices of user interface 1135 may store analog or digital signals on memory 1140 to be further processed by DSP(s) 1112 or general purpose/application processor 1111 in response to an action from a user. Similarly, applications hosted on UE 105 may store analog or digital signals on memory 1140 to present an output signal to a user. In another implementation, UE 105 may optionally include a dedicated audio input/output (I/O) device 1170 comprising, for example, a dedicated speaker, microphone, digital to analog circuitry, analog to digital circuitry, amplifiers and/or gain control. It should be understood, however, that this is merely an example of how an audio I/O may be implemented in a UE, and that claimed subject matter is not limited in this respect. In another implementation, UE 105 may comprise touch sensors 1162 responsive to touching or pressure on a keyboard or touch screen device.

UE 105 may also comprise a dedicated camera device 1164 for capturing still or moving imagery. Dedicated camera device 1164 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 1111 or DSP(s) 1112. Alternatively, a dedicated video processor 1168 may perform conditioning, encoding, compression or manipulation of signals representing captured images. Additionally, dedicated video processor 1168 may decode/decompress stored image data for presentation on a display device (not shown) on UE 105.

UE 105 may also comprise sensors 1160 coupled to bus 1101 which may include, for example, inertial sensors, environment sensors. Inertial sensors of sensors 1160 may comprise, for example accelerometers (e.g., collectively responding to acceleration of UE 105 in three dimensions), one or more gyroscopes or one or more magnetometers (e.g., to support one or more compass applications). Environment sensors of UE 105 may comprise, for example, temperature sensors, barometric pressure sensors, ambient light sensors, camera imagers, microphones, just to name few examples. Sensors 1160 may generate analog or digital signals that may be stored in memory 1140 and processed by DPS(s) 1112 or general purpose/application processor 1111 in support of one or more applications such as, for example, applications directed to positioning or navigation operations. In some implementations, UE 105 may be associated with sensors external to UE 105 that communicate with UE 105 (e.g. with DPS(s) 1112 or general purpose/application processor 1111) via short range wireless signals (such as for Zigbee or Bluetooth) received and transmitted using wireless transceiver 1121 and wireless antenna 1122. Sensors external to UE 105 (not shown in FIG. 11) may be used to monitor a medical condition for and/or the general health of a user of UE 105 and/or may be used to monitor an environment for the user of UE 105 such an external air temperature, air quality, humidity, presence of toxic gases (e.g. carbon monoxide), presence of smoke etc. Sensors 1160 and/or sensors external to UE 105 may be used to detect conditions of possible danger to a user of UE 105 and to automatically invoke an emergency call using UE 105 in certain conditions.

In a particular implementation, UE 105 may comprise a dedicated modem processor 1166 capable of performing baseband processing of signals received and downconverted at wireless transceiver 1121 or SPS receiver 1155. Similarly, dedicated modem processor 1166 may perform baseband processing of signals to be upconverted for transmission by wireless transceiver 1121. In alternative implementations, instead of having a dedicated modem processor, baseband processing may be performed by a general purpose processor or DSP (e.g., general purpose/application processor 1111 or DSP(s) 1112). It should be understood, however, that these are merely examples of structures that may perform baseband processing, and that claimed subject matter is not limited in this respect.

Figure 12:
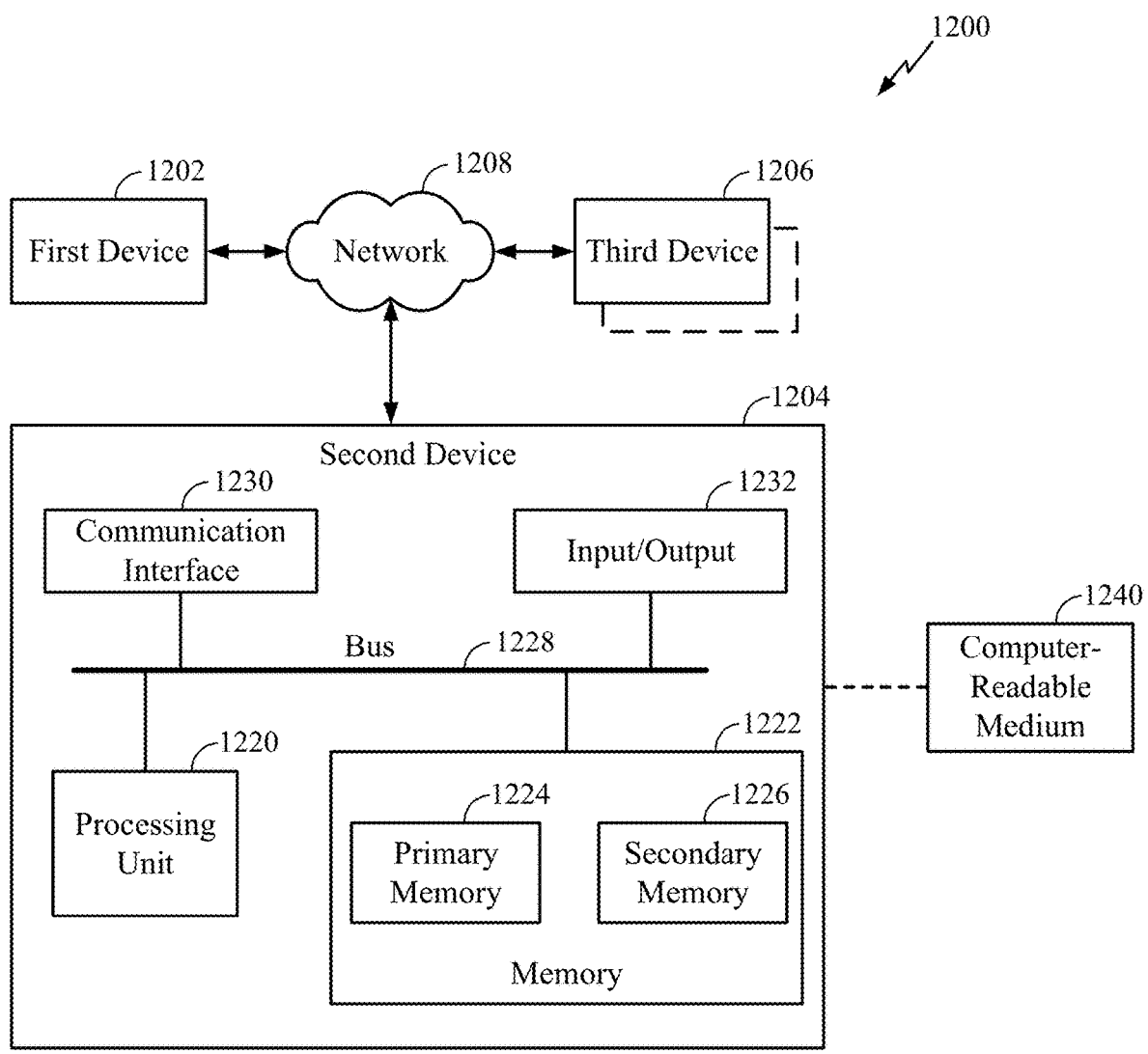
FIG. 12 is a schematic block diagram of an example computing system in accordance with an implementation.

FIG. 12 is a schematic diagram illustrating an example system 1200 that may include one or more devices configurable to implement techniques or processes described above. System 1200 may include, for example, a first device 1202, a second device 1204, and a third device 1206, which may be operatively coupled together through a communication network 1208.

In an aspect, any of first device 1202, second device 1204, or third device 1206 may correspond to a network entity such as anchor point 130, an EATF (e.g. EATF 460s for FIGS. 5-7), an E-CSCF (e.g. E-CSCF 430s or E-CSCF 430t for FIGS. 5-7), a P-CSCF (e.g. P-CSCF 425s or P-CSCF 425t for FIGS. 5-7), an LRF (e.g. LRF 490s or LRF 490t for FIGS. 5-7), an AP (e.g. WiFi AP 110), or a base station (e.g. BS 115). In an aspect, any of first device 1202, second device 1204, or third device 1206 may perform the method 900 of FIG. 9 and/or the method 1000 of FIG. 10. In an aspect, communication network 1208 may correspond source network 120, target network 125, home network 170, the Internet 195 or some combination of one or more of these networks. In an aspect, one or more of first device 1202, second device 1204, or third device 1206 may be part of communication network 1208.

By way of example but not limitation, any of first device 1202, second device 1204, or third device 1206 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1202, 1204, and 1206, respectively, may comprise one or more of a location server (e.g. an E-SLP or E-SMLC), base station almanac server, a base station, or a mobile device in accordance with the examples described herein.

Similarly, communication network 1208, may be representative of one or more communication links (e.g., wired or wireless communication links), processes, or resources configurable to support the exchange of data between at least two of first device 1202, second device 1204, and third device 1206. By way of example but not limitation, communication network 1208 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 1206, there may be additional like devices operatively coupled to communication network 1208.

It is recognized that all or part of the various devices and networks shown in system 1200, and the processes and methods as further described herein, may be implemented using or otherwise including hardware, firmware, software, or any combination thereof. Thus, by way of example but not limitation, second device 1204 may include at least one processing unit 1220 that is operatively coupled to a memory 1222 through a bus 1228.

Processing unit 1220 is representative of one or more circuits configurable to perform at least a portion of a data computing procedure or process. By way of example but not limitation, processing unit 1220 may include one or more processors, controllers, microprocessors, microcontrollers, application specific integrated circuits, digital signal processors, programmable logic devices, field programmable gate arrays, and the like, or any combination thereof.

Memory 1222 is representative of any data storage mechanism. Memory 1222 may include, for example, a primary memory 1224 and/or a secondary memory 1226. Primary memory 1224 may include, for example, a random access memory, read only memory, etc. While illustrated in this example as being separate from processing unit 1220, it should be understood that all or part of primary memory 1224 may be provided within or otherwise co-located/coupled with processing unit 1220. In combination with communication interface 1230, processing unit 1220 may execute instructions to perform all or portions of actions discussed above.

Secondary memory 1226 may include, for example, the same or similar type of memory as primary memory or one or more data storage devices or systems, such as, for example, a disk drive, an optical disc drive, a tape drive, a solid state memory drive, etc. In certain implementations, secondary memory 1226 may be operatively receptive of, or otherwise configurable to couple to, a computer-readable medium 1240. Computer-readable medium 1240 may include, for example, any non-transitory storage medium that can carry or make accessible data, code or instructions for one or more of the devices in system 1200. Computer-readable medium 1240 may also be referred to as a storage medium.

Second device 1204 may include, for example, a communication interface 1230 that provides for or otherwise supports the operative coupling of second device 1204 to at least communication network 1208. By way of example but not limitation, communication interface 1230 may include a network interface device or card, a modem, a router, a switch, a transceiver, and the like.

Second device 1204 may include, for example, an input/output device 1232. Input/output device 1232 is representative of one or more devices or features that may be configurable to accept or otherwise introduce human or machine inputs, or one or more devices or features that may be configurable to deliver or otherwise provide for human or machine outputs. By way of example but not limitation, input/output device 1232 may include an operatively configured display, speaker, keyboard, mouse, trackball, touch screen, data port, etc.

Figure 13:
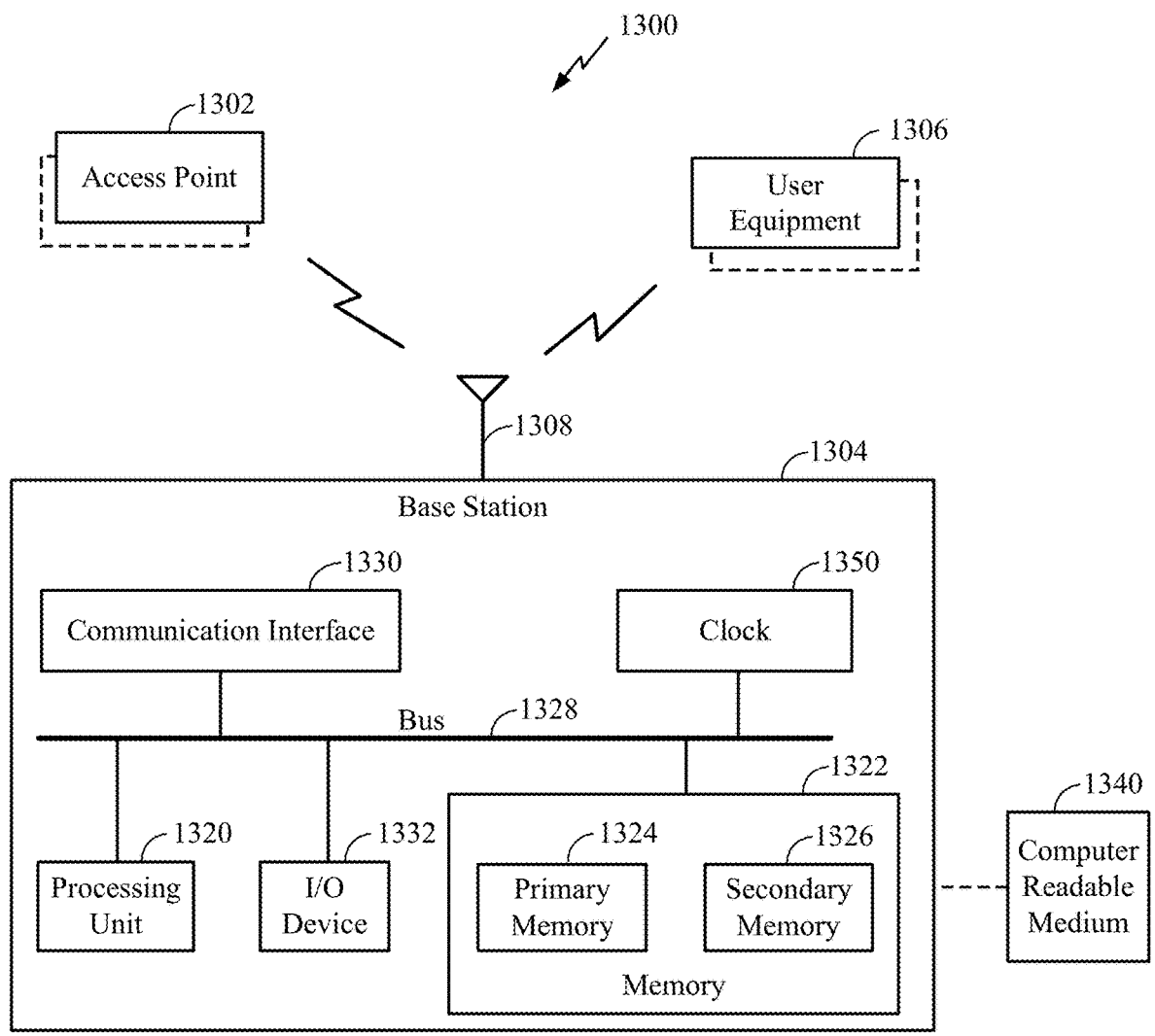
FIG. 13 is a schematic block diagram of an example computing system in accordance with an implementation.

FIG. 13 is a schematic diagram illustrating an example system 1300 that may include one or more devices configurable to implement techniques or processes described above, for example, in connection with FIGS. 1-10. System 1300 may include, for example, a first device 1302, a second device 1304, and a third device 1306, which may be operatively coupled together through a wireless communications network. In an aspect, first device 1302 may comprise an access point as shown, such as an AP 110. Second device 1304 may comprise a base station such as a BS 115 or an eNB 405, and third device 1306 may comprise a UE such as UE 105, in an aspect. Also, in an aspect, devices 1302, 1304 and 1302 may be included in a wireless communications network or networks, such as source network 120 and/or target network 125, which may comprise one or more wireless access points and/or base stations, for example. However, claimed subject matter is not limited in scope in these respects.

First device 1302, second device 1304 and third device 1306, as shown in FIG. 13, may be representative of any device, appliance or machine that may be configurable to exchange voice and/or data over a wireless communications network. By way of example but not limitation, any of first device 1302, second device 1304, or third device 1306 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 1302, 1304, and 1306, respectively, may comprise one or more of an access point or a mobile device in accordance with the examples described herein.

In an aspect, system 1300 may be part of a wireless communications network or networks (e.g. source network 120 and/or target network 125) that may comprise one or more communication links, processes, or resources (not shown in FIG. 13) configurable to support the exchange of voice and/or data between at least two of first device 1302, second device 1304, and third device 1306. By way of example but not limitation, a wireless communications network may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 1306, there may be additional like devices operatively coupled to system 1300.

It is recognized that all or part of the various devices shown in FIG. 13, and the processes and methods as further described herein, may be implemented using or otherwise including hardware, firmware, software, or any combination thereof. Thus, by way of example but not limitation, second device 1304 may include at least one processing unit 1320 that is operatively coupled to a memory 1322 through a bus 1328.

Processing unit 1320 is representative of one or more circuits configurable to perform at least a portion of a data computing procedure or process. By way of example but not limitation, processing unit 1320 may include one or more processors, controllers, microprocessors, microcontrollers, application specific integrated circuits, digital signal processors, programmable logic devices, field programmable gate arrays, and the like, or any combination thereof.

Memory 1322 is representative of any data storage mechanism. Memory 1322 may include, for example, a primary memory 1324 and/or a secondary memory 1326. Primary memory 1324 may include, for example, a random access memory, read only memory, etc. While illustrated in this example as being separate from processing unit 1320, it should be understood that all or part of primary memory 1324 may be provided within or otherwise co-located/coupled with processing unit 1320. In a particular implementation, memory 1322 and processing unit 1320 may be configured to execute one or more aspects of process discussed above.

Secondary memory 1326 may include, for example, the same or similar type of memory as primary memory or one or more data storage devices or systems, such as, for example, a disk drive, an optical disc drive, a tape drive, a solid state memory drive, etc. In certain implementations, secondary memory 1326 may be operatively receptive of, or otherwise configurable to couple to, a computer-readable medium 1340. Computer-readable medium 1340 may include, for example, any non-transitory medium that can carry or make accessible data, code or instructions for one or more of the devices in system 1300. Computer-readable medium 1340 may also be referred to as a storage medium.

Second device 1304 may further comprise a clock 1350 comprising circuitry, registers, memory, etc. that is capable of advancing and maintaining a clock state. In a particular implementation, a clock state may be advanced by incrementing a counter or other value on set increment cycles (e.g., in response to an oscillating signal). In particular implementations, clock 1350 may comprise registers, oscillators, input terminals output terminals, etc. capable of providing values indicative of a clock state. In particular embodiments, a clock state maintained at clock 1350 may be used to control processes to execute application functions in a coordinated fashion on processing unit 1320. A clock state maintained at clock 1350 may be synchronized with clock states maintained by devices other than second device 1304 (e.g., first device 1302 and third device 1306).

Second device 1304 may include, for example, a communication interface 1330 that provides for or otherwise supports the operative coupling of second device 1304 to a wireless communications network at least through an antenna 1308. By way of example but not limitation, communication interface 1330 may include a network interface device or card, a modem, a router, a switch, a transceiver, and the like. In other alternative implementations, communication interface 1330 may comprise a wired/LAN interface, wireless LAN interface (e.g., IEEE std. 802.11 wireless interface) and/or a wide area network (WAN) air interface. In a particular implementation, antenna 1308 in combination with communication interface 1330 may be used to implement transmission and reception of signals as discussed above.

Second device 1304 may include, for example, an input/output (I/O) device 1332. Input/output device 1332 is representative of one or more devices or features that may be configurable to accept or otherwise introduce human or machine inputs, or one or more devices or features that may be configurable to deliver or otherwise provide for human or machine outputs. By way of example but not limitation, input/output device 1332 may include an operatively configured display, speaker, keyboard, mouse, trackball, touch screen, data port, etc.

Though nor described or shown in detail, either or both of first device 1302 and third device 1306 may include some or all of the same types of hardware and software components as just described for second device 1304.

As used herein, the terms "access point" and "base station" are meant to include any wireless communication station and/or device used to facilitate communication in a wireless communications system, such as, for example, a wireless local area network (WLAN) or a wireless wide area network (WWAN), although the scope of claimed subject matter is not limited in this respect. In another aspect, an access point (e.g. an AP 110) may comprise a wireless local area network (WLAN) access point, for example. Such a WLAN may comprise a network compatible and/or compliant with one or more versions of IEEE standard 802.11 in an aspect, although the scope of claimed subject matter is not limited in this respect. A WLAN access point may provide communication between one or more mobile devices (e.g. a UE 105) and a network such as the Internet, for example. Similarly, a base station (e.g. a BS 115 or eNB 405) may comprise a base station, eNodeB, gNodeB for a WWAN such as a WWAN supporting wireless communication according to a 3GPP GSM, WCDMA, UMTS, LTE, 5G or NR wireless access specification, although the scope of claimed subject matter is not limited in this respect. A base station (e.g. a BS 115 or eNB 405) may provide communication between one or more mobile devices (e.g. a UE 105) and a network such as the Internet, for example.

As used herein, the terms "mobile device" and "user equipment" (UE) refer to a device that may from time to time have a position location that changes. The changes in position location may comprise changes to direction, distance, orientation, etc., as a few examples. In particular examples, a UE may comprise a cellular telephone, wireless communication device, laptop computer, other personal communication system (PCS) device, personal digital assistant (PDA), personal audio device (PAD), portable navigational device, and/or other portable communication devices. A UE may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Algorithmic descriptions and/or symbolic representations are examples of techniques used by those of ordinary skill in the signal processing and/or related arts to convey the substance of their work to others skilled in the art. An algorithm is here, and generally, is considered to be a self-consistent sequence of operations and/or similar signal processing leading to a desired result. In this context, operations and/or processing involve physical manipulation of physical quantities. Typically, although not necessarily, such quantities may take the form of electrical and/or magnetic signals and/or states capable of being stored, transferred, combined, compared, processed or otherwise manipulated as electronic signals and/or states representing various forms of content, such as signal measurements, text, images, video, audio, etc. It has proven convenient at times, principally for reasons of common usage, to refer to such physical signals and/or physical states as bits, values, elements, symbols, characters, terms, numbers, numerals, messages, frames, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically represented as physical electronic and/or magnetic quantities within memories, registers, and/or other storage devices, transmission devices, and/or display devices of the special purpose computer and/or similar special purpose computing and/or network device. In the context of this particular patent application, as mentioned, the term "specific apparatus" may include a general purpose computing and/or network device, such as a general purpose computer, once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation and/or a physical change and/or transformation in molecular structure, such as from crystalline to amorphous or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state form a binary one to a binary zero or vice-versa in a memory device may comprise a transformation, such as a physical transformation. Rather, the foregoing is intended as illustrative examples.

Wireless communication techniques described herein may be in connection with various wireless communications networks such as a wireless wide area network ("WWAN"), a wireless local area network ("WLAN"), a wireless personal area network (WPAN), and so on. In this context, a "wireless communication network" comprises multiple devices or nodes capable of communicating with one another through one or more wireless communication links. As shown in FIGS. 1 and 4, for example, a wireless communication network may comprise two or more devices from APs 110, BSs 115 and UEs 105. The term "network" and "system" may be used interchangeably herein. A WWAN may be a Code Division Multiple Access ("CDMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("WCDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("D-AMPS"), or some other RAT. GSM and WCDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") and 5G communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, a wireless transmitter or access point (e.g. a BS 115 or AP 110) may comprise a femtocell or home base station, utilized to extend cellular telephone service into a business or home. In such an implementation, one or more UEs may communicate with a femtocell via a code division multiple access ("CDMA") cellular communication protocol, LTE, or 5G for example, and the femtocell may provide the UE access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

Likewise, in this context, the terms "coupled", "connected," and/or similar terms are used generically. It should be understood that these terms are not intended as synonyms. Rather, "connected" is used generically to indicate that two or more components, for example, are in direct physical, including electrical, contact; while, "coupled" is used generically to mean that two or more components are potentially in direct physical, including electrical, contact; however, "coupled" is also used generically to also mean that two or more components are not necessarily in direct contact, but nonetheless are able to co-operate and/or interact. The term coupled is also understood generically to mean indirectly connected, for example, in an appropriate context.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for all of the foregoing, particular context of description and/or usage provides helpful guidance regarding inferences to be drawn. It should be noted that the following description merely provides one or more illustrative examples and claimed subject matter is not limited to these one or more examples; however, again, particular context of description and/or usage provides helpful guidance regarding inferences to be drawn.

In this context, the term network device refers to any device capable of communicating via and/or as part of a network and may comprise a computing device. While network devices may be capable of sending and/or receiving signals (e.g., signal packets and/or frames), such as via a wired and/or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, wearable devices, integrated devices combining two or more features of the foregoing devices, the like or any combination thereof. Signal packets and/or frames, for example, may be exchanged, such as between a server and a client device and/or other types of network devices, including between wireless devices coupled via a wireless network, for example. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

References throughout this specification to one implementation, an implementation, one embodiment, an embodiment, as aspect, and/or the like means that a particular feature, structure, and/or characteristic described in connection with a particular implementation and/or embodiment is included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described are capable of being combined in various ways in one or more implementations and, therefore, are within intended claim scope, for example. In general, of course, these and other issues vary with context. Therefore, particular context of description and/or usage provides helpful guidance regarding inferences to be drawn.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method at a user equipment (UE) for a handoff of an emergency services call, comprising:
   establishing a first call with a WiFi network for a first network operator, wherein the first call is an emergency services call to a public safety answering point (PSAP);
   receiving an Emergency Session Transfer Identifier (E-STI) indicating the emergency services call or the handover of the emergency services call from the WiFi network during establishment of the first call, wherein the E-STI comprises a Telephone Number, a Telephone Number (Tel) Uniform Resource Identifier (URI), or a Universal Resource Name (URN);
   determining impaired wireless coverage for the WiFi network;
   determining unimpaired wireless coverage for a cellular network, wherein the cellular network is for a second network operator different to the first network operator for the WiFi network; and
   establishing a second call with the cellular network, wherein the second call is a continuation of the first call to the PSAP established with the WiFi network, wherein the second call is established based on the E-STI.

2. The method of claim 1, wherein the E-STI further comprises a first indication of a network entity for the WiFi network, a second indication of the UE, a third indication of the handoff of the emergency services call or a fourth indication of some combination thereof.

3. The method of claim 2, wherein establishing the second call based comprises sending a message to the cellular network, the message comprising the E-STI.

4. The method of claim 3, wherein the message is a Session Initiation Protocol (SIP) INVITE message, a Direct Transfer Application Part (DTAP) SETUP message or a DTAP Emergency SETUP message.

5. The method of claim 4, wherein the second call is an emergency services call.

6. An apparatus at a user equipment (UE) for a handoff of an emergency services call, comprising:
   a memory; and
   at least one processor coupled to the memory and configured to:
      establish a first call with a WiFi network for a first network operator, wherein the first call is an emergency services call to a public safety answering point (PSAP);
      receive an Emergency Session Transfer Identifier (E-STI) indicating the emergency services call or the handover of the emergency services call from the WiFi network during establishment of the first call, wherein the E-STI comprises a Telephone Number, a Telephone Number (Tel) Uniform Resource Identifier (URI), or a Universal Resource Name (URN);
      determine impaired wireless coverage for the WiFi network;
      determine unimpaired wireless coverage for a cellular network, wherein the cellular network is for a second network operator different to the first network operator for the WiFi network; and
      establish a second call with the cellular network, wherein the second call is a continuation of the first call to the PSAP established with the WiFi network, wherein the second call is established based on the E-STI.

7. The apparatus of claim 6, wherein the E-STI further comprises a first indication of a network entity for the WiFi network, a second indication of the UE, a third indication of the handoff of an emergency services call or a fourth indication of some combination thereof.

8. The apparatus of claim 7, wherein establishing the second call based comprises sending a message to the cellular network, the message comprising the E-STI.

9. The apparatus of claim 8, wherein the message is a Session Initiation Protocol (SIP) INVITE message, a Direct Transfer Application Part (DTAP) SETUP message or a DTAP Emergency SETUP message.

10. The apparatus of claim 9, wherein the second call is an emergency services call.

* * * * *